United States Patent
Yang et al.

(10) Patent No.: US 11,695,533 B2
(45) Date of Patent: Jul. 4, 2023

(54) SIDELINK RESOURCE POOL ACTIVATION AND DEACTIVATION FOR POWER SAVINGS

(71) Applicant: QUALCOMM Incorporated, San Diego, CA (US)

(72) Inventors: Wei Yang, San Diego, CA (US); Seyedkianoush Hosseini, San Diego, CA (US); Hung Dinh Ly, San Diego, CA (US); Yuchul Kim, San Diego, CA (US); Peter Gaal, San Diego, CA (US); Wanshi Chen, San Diego, CA (US); Juan Montojo, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 17/127,457

(22) Filed: Dec. 18, 2020

(65) Prior Publication Data
US 2022/0200774 A1 Jun. 23, 2022

(51) Int. Cl.
| | | |
|---|---|---|
| *H04W 68/00* | (2009.01) | |
| *H04L 5/00* | (2006.01) | |
| *H04W 72/02* | (2009.01) | |
| *H04W 80/02* | (2009.01) | |
| *H04W 24/08* | (2009.01) | |
| *H04W 72/0453* | (2023.01) | |

(52) U.S. Cl.
CPC ........... *H04L 5/0098* (2013.01); *H04W 24/08* (2013.01); *H04W 72/02* (2013.01); *H04W 72/0453* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2020/0228290 A1* | 7/2020 | Baghel | H04L 1/1893 |
| 2021/0099265 A1* | 4/2021 | Shin | H04W 72/0453 |
| 2021/0160822 A1* | 5/2021 | Hassan | H04W 4/90 |

(Continued)

FOREIGN PATENT DOCUMENTS

WO WO-2019160788 A1 * 8/2019 ............ H04W 72/10

*Primary Examiner* — Sithu Ko
(74) *Attorney, Agent, or Firm* — Procopio, Cory, Hargreaves & Savitch LLP

(57) ABSTRACT

Apparatus, methods, and computer-readable media for facilitating sidelink resource pool activation and deactivation for sidelink communication are disclosed herein. An example method for wireless communication at a first sidelink device includes identifying a configuration of a bandwidth part (BWP) for sidelink communication. In some examples, the BWP may comprise at least a first resource pool including a first subset of frequency resources and a second resource pool including a second subset of frequency resources. The example method also includes receiving an activation indication activating the second subset of frequency resources of the second resource pool. Additionally, the example method includes activating the second subset of frequency resources of the second resource pool based on the activation indication.

30 Claims, 17 Drawing Sheets

(56) References Cited

U.S. PATENT DOCUMENTS

| | | | |
|---|---|---|---|
| 2021/0219268 A1* | 7/2021 | Li | H04L 1/1887 |
| 2021/0243762 A1* | 8/2021 | Selvanesan | H04W 72/0446 |
| 2021/0336756 A1* | 10/2021 | Chae | H04L 5/1469 |
| 2021/0345300 A1* | 11/2021 | Selvanesan | H04L 5/001 |
| 2021/0360590 A1* | 11/2021 | Lee | H04L 5/0091 |
| 2021/0410114 A1* | 12/2021 | Lee | H04W 4/40 |
| 2022/0007378 A1* | 1/2022 | Basu Mallick | H04L 5/0064 |
| 2022/0015072 A1* | 1/2022 | Hwang | H04W 56/001 |
| 2022/0217684 A1* | 7/2022 | Zhao | H04W 72/56 |

* cited by examiner

SIDELINK RESOURCE POOL ACTIVATION AND DEACTIVATION FOR POWER SAVINGS

BACKGROUND

Technical Field

The present disclosure relates generally to communication systems, and more particularly, to sidelink communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a first sidelink device. An example apparatus identifies a configuration of a bandwidth part (BWP) for sidelink communication, the BWP comprising at least a first resource pool including a first subset of frequency resources and a second resource pool including a second subset of frequency resources. The example apparatus also receives an activation indication activating the second subset of frequency resources of the second resource pool. Additionally, the example apparatus activates the second subset of frequency resources of the second resource pool based on the activation indication.

In another aspect of the disclosure, a method, a computer-readable medium, and an apparatus are provided for wireless communication of a first sidelink device. An example apparatus identifies a configuration of a bandwidth part (BWP) for sidelink communication, the BWP comprising at least a first resource pool including a first subset of frequency resources and a second resource pool including a second subset of frequency resources. The example apparatus also transmits an activation indication to a second sidelink device, the activation indication activating the second subset of frequency resources of the second resource pool. Additionally, the example apparatus transmits a sidelink transmission to the second sidelink device in the second subset of frequency resources of the second resource pool.

In another aspect of the disclosure, a method, a computer-readable medium, and an apparatus are provided for wireless communication of a base station. An example apparatus identifies identifying a configuration of a bandwidth part (BWP) for sidelink communication, the BWP comprising at least a first resource pool including a first subset of frequency resources and a second resource pool including a second subset of frequency resources. The example apparatus also transmits an activation indication activating the second subset of frequency resources of the second resource pool.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
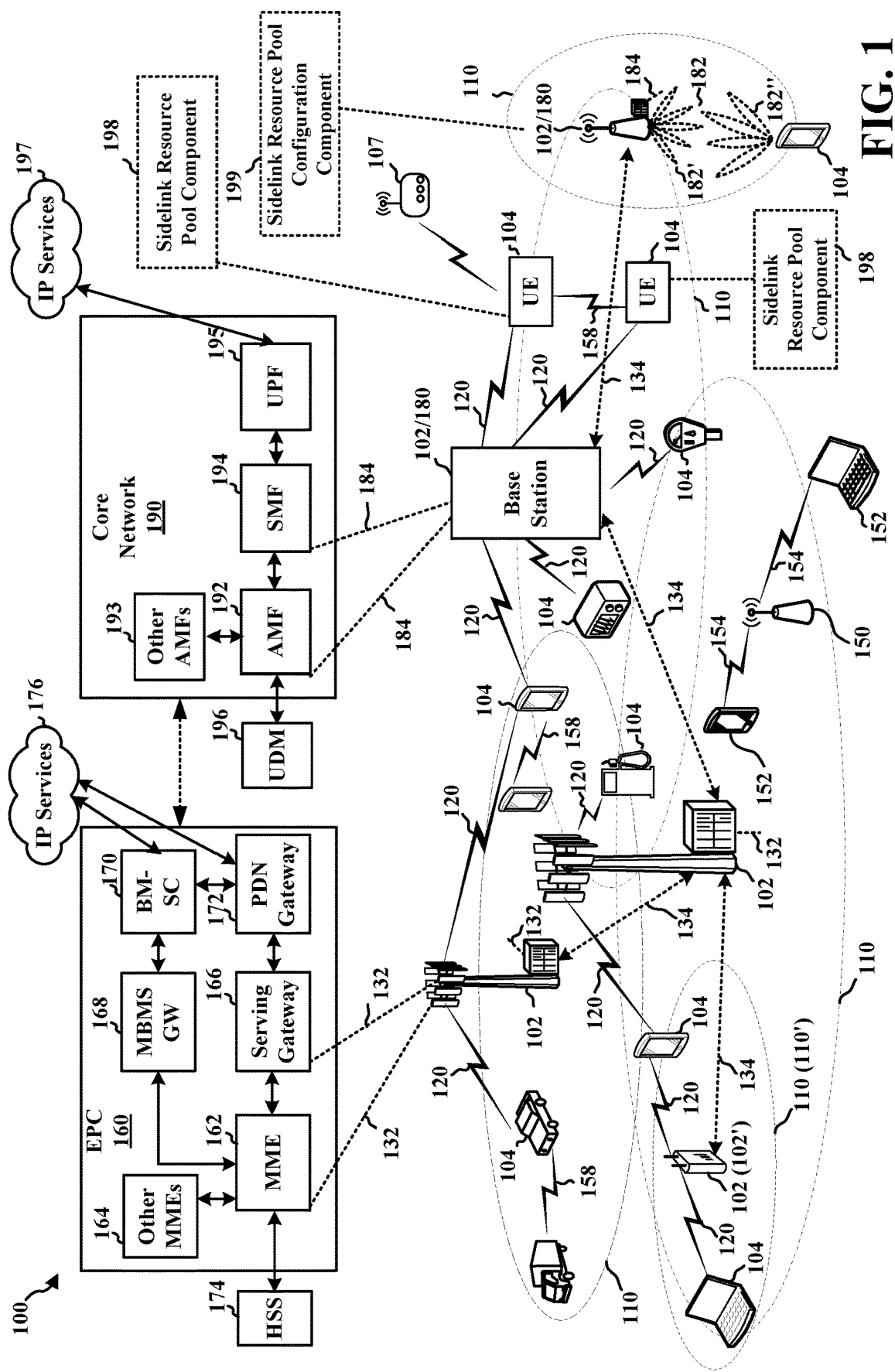
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The use of a bandwidth part (BWP) that includes a subset of contiguous resource blocks within a frequency range of a carrier may enable a user equipment (UE) to achieve power savings. Sidelink communication that occurs directly between UEs may include unique challenges to avoid interference that are different than communication between a UE and a base station. Sidelink communication may include a single BWP for a sidelink carrier. The use of a single BWP for a sidelink carrier may help to avoid interference among sidelink transmissions. However, a single BWP constrains an ability to provide power savings through communication when there are changes in instantaneous traffic. For example, a receiving sidelink UE may scan all resources/subchannels in a frequency domain corresponding to the BWP to receive a packet, regardless of the amount of traffic the receiving sidelink UE expects. Aspects presented herein provide for the configuration of multiple resource pools at the BWP in a sidelink carrier. Bandwidth adaptation may be performed to achieve power saving over sidelink by activating and/or deactivating one or more resource pools based on, for example, changes in instantaneous traffic needs.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link

158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

In some examples, a wireless communication device, such as a UE 104 or other device communicating based on sidelink, may be configured to manage one or more aspects of wireless communication by facilitating activating and deactivating resources pools in a bandwidth part of a sidelink carrier based on a received indication. As an example, in FIG. 1, the UE 104 may include a sidelink resource pool component 198 configured to identify a configuration of a bandwidth part (BWP) for sidelink communication, the BWP comprising at least a first resource pool including a first subset of frequency resources and a second resource pool including a second subset of frequency resources. The example sidelink resource pool component 198 may also be configured to receive an activation indication activating the second subset of frequency resources of the second resource pool. Additionally, the example sidelink resource pool component 198 may be configured to activate the second subset of frequency resources of the second resource pool based on the activation indication.

In some examples, the wireless communication, such as the UE 104 or other device communicating based on sidelink, may be configured to manage one or more aspects of wireless communication by facilitating activating and deactivating resources pools in a bandwidth part of a sidelink carrier at a receiving sidelink device. As an example, in FIG. 1, the UE 104 may include the sidelink resource pool component 198 configured to identify a configuration of a BWP for sidelink communication, the BWP comprising at least a first resource pool including a first subset of frequency resources and a second resource pool including a second subset of frequency resources. The example sidelink resource pool component 198 may also be configured to transmit an activation indication to a second sidelink device, the activation indication activating the second subset of frequency resources of the second resource pool. Additionally, the example sidelink resource pool component 198 may be configured to transmit a sidelink transmission to the second sidelink device in the second subset of frequency resources of the second resource pool.

Still referring to FIG. 1, in some examples, a communication device, such as a base station 102/180, may be configured to manage one or more aspects of wireless communication by facilitating activating and deactivating resources pools in a bandwidth part of a sidelink carrier at a sidelink device. As an example, in FIG. 1, the base station 102/180 may include a sidelink resource pool configuration component 199 configured to identify a configuration of a BWP for sidelink communication, the BWP comprising at least a first resource pool including a first subset of frequency resources and a second resource pool including a second subset of frequency resources. The example sidelink resource pool configuration component 199 may also be configured to transmit an activation indication activating the second subset of frequency resources of the second resource pool.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and the UE 104, the aspects may be similarly applied between a first device and a second device (e.g., a first UE and a second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referredto as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
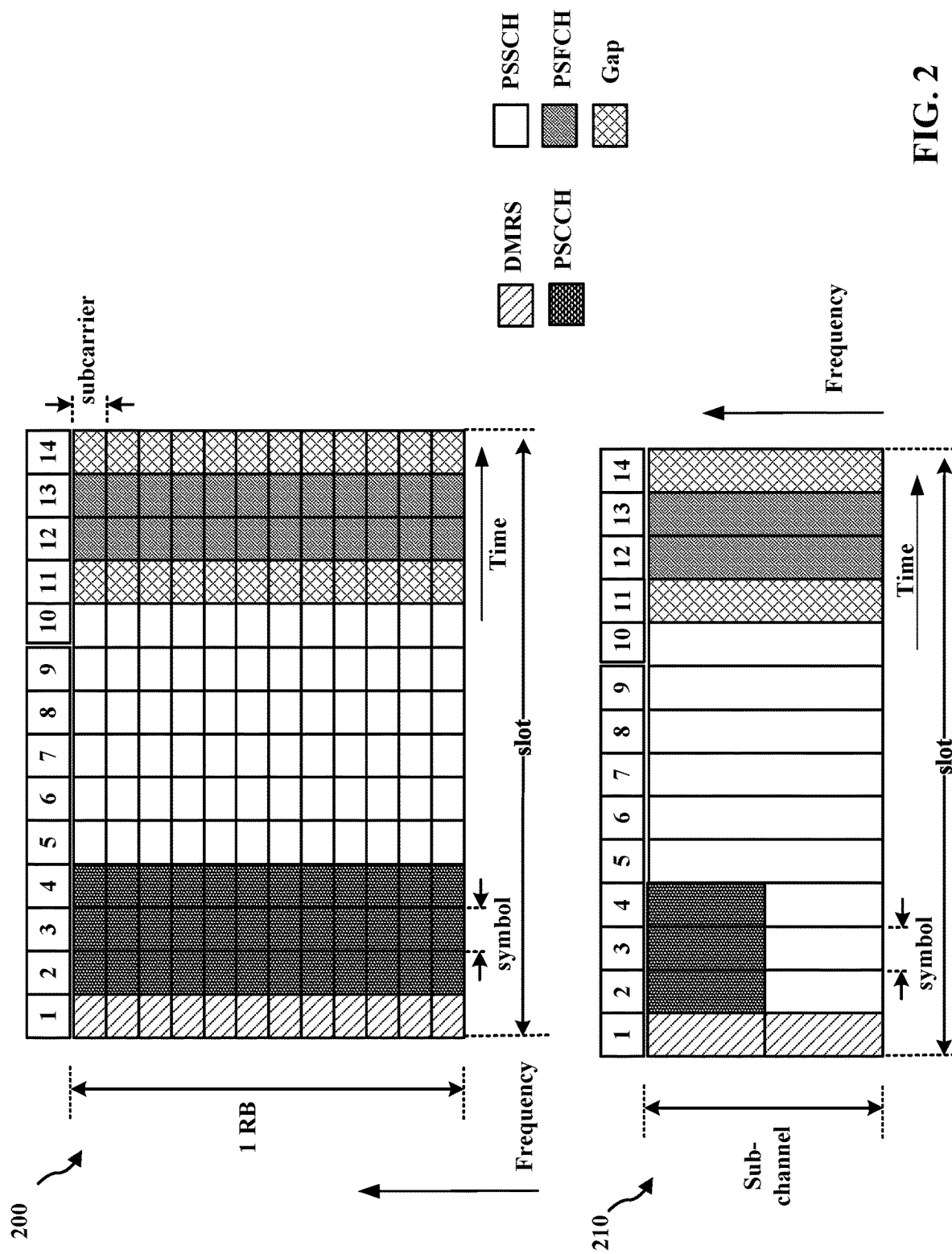
FIG. 2 is a diagram illustrating example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
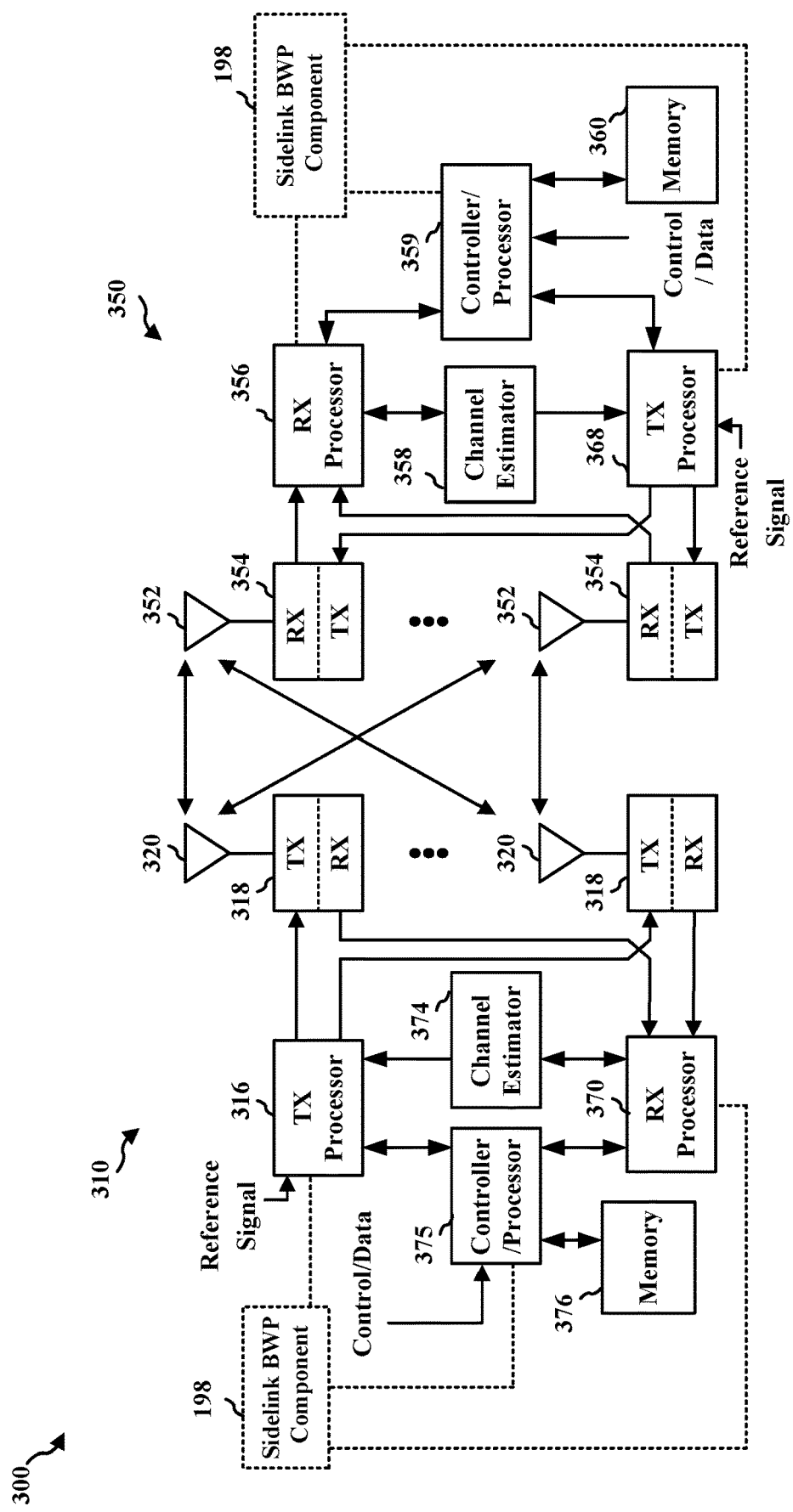
FIG. 3 is a diagram illustrating an example of first device and a second device involved in wireless communication based on, for example, sidelink.

FIG. 3 is a block diagram 300 of a first wireless communication device 310 in communication with a second wireless communication device 350 based on sidelink. In some examples, the wireless communication devices 310, 350 may communicate based on V2X or other D2D communication. The communication may be based on sidelink using a PC5 interface. The wireless communication devices 310, 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318 TX. Each transmitter 318 TX may modulate an RF carrier with a respective spatial stream for transmission.

At the second wireless communication device 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by a channel estimator 358. The soft decisions are then decoded and deinterleaved to recover the data and control signals that were originally transmitted by the first wireless communication device 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an acknowledgement (ACK) and/or negative acknowledgement (NACK) protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The transmission is processed at the first wireless communication device 310 in a manner similar to that described in connection with the receiver function at the second wireless communication device 350. Each receiver 318 RX receives a signal through its respective antenna 320. Each receiver 318 RX recovers information modulated onto an RF carrier and provides the information to an RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an acknowledgement (ACK) and/or negative acknowledgement (NACK) protocol to support HARQ operations.

At least one of the TX processor 368, the RX processor 356, and the controller/processor 359 may be configured to perform aspects in connection with the sidelink resource pool component 198 of FIG. 1.

At least one of the TX processor 316, the RX processor 370, and the controller/processor 375 may be configured to perform aspects in connection with the sidelink resource pool configuration component 199 of FIG. 1.

Figure 4:
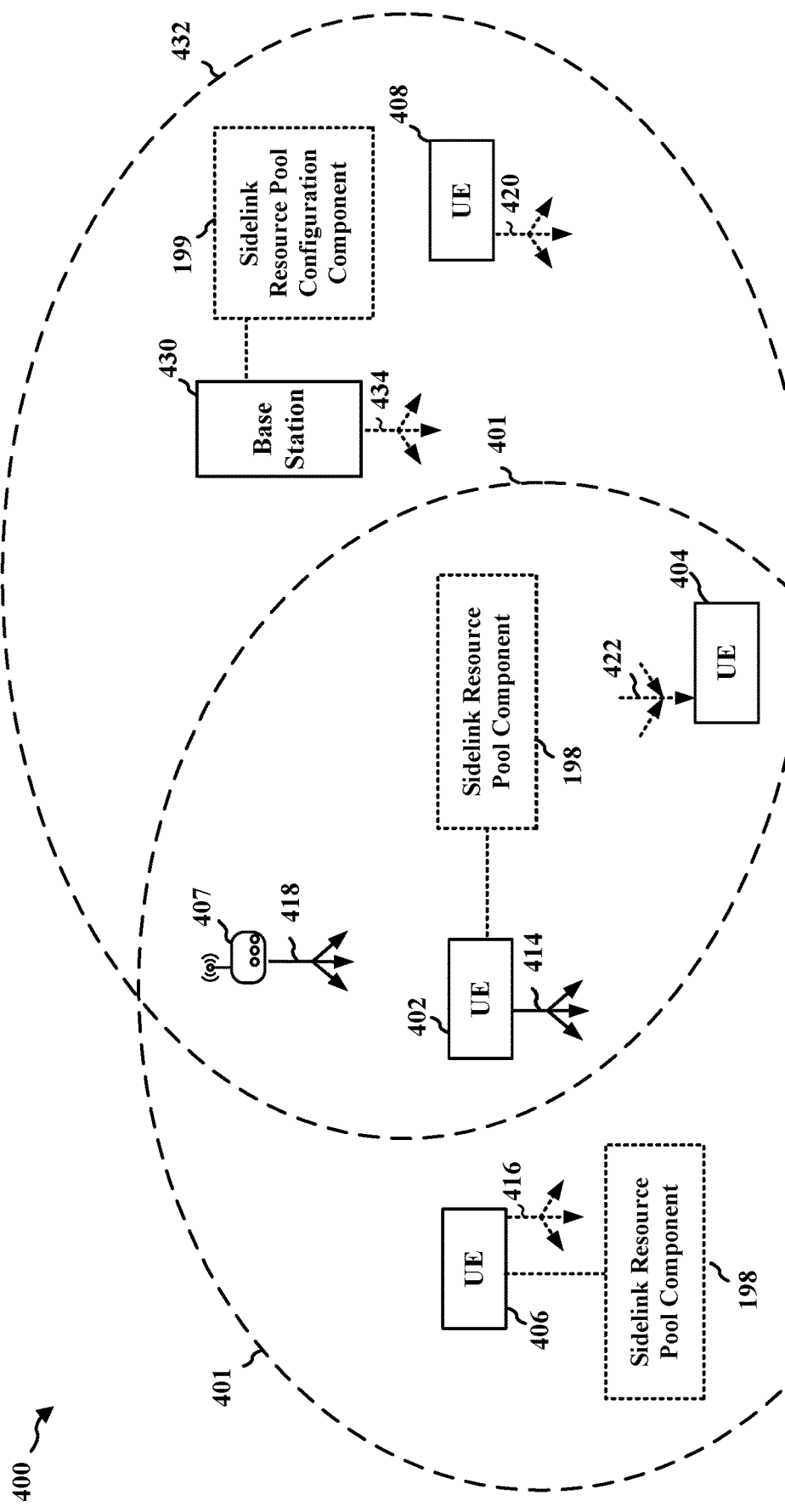
FIG. 4 is a diagram illustrating an example system based on sidelink communication, in accordance with the teachings disclosed herein.

FIG. 4 illustrates an example 400 of wireless communication between devices based on sidelink communication. The communication may be based on a slot structure comprising aspects described in connection with FIG. 2. For example, a first UE 402 may transmit a transmission 414, e.g., comprising a control channel (e.g., a PSCCH) and/or a corresponding data channel (e.g., a PSSCH), that may be received by a second UE 404, a third UE 406, and/or a fourth UE 408 directly from the first UE 402, e.g., without being transmitted through a base station. The UEs 402, 404, 406, 408 may each be capable of operating as a transmitting device in addition to operating as a receiving device. Thus, the third UE 406 is illustrated as transmitting a transmission 416 and the fourth UE 408 is illustrated as transmitting a transmission 420. The transmissions 414, 416, 420 may be broadcast or multicast to nearby devices. For example, the first UE 402 may transmit communication intended for receipt by other UEs within a range 401 of the first UE 402. Additionally, or alternatively, an RSU 407 may receive communication from and/or transmit communication 418 to the UEs 402, 404, 406, 408.

The first UE 402 may provide sidelink control information (SCI) with information for decoding the corresponding data channel. The SCI may also include information that a receiving device may use to avoid interference. For example, the SCI may indicate time and frequency resources that will be occupied by the data transmission, and may be indicated in a control message from the transmitting device.

In some examples, a base station 430 may communicate with one or more communication devices within a range 432 of the base station 430. For example, the base station 430 may communicate with the first UE 402, the second UE 404, the fourth UE 408, and the RSU 407. Although the third UE 406 is not within the range 432 of the base station 430, in some examples, the first UE 402 may be configured to operate as a relay that helps to connect the third UE 406 to the base station 430 by relaying traffic between the third UE 406 and the base station 430. For example, the base station 430 may transmit a message via a transmission 434 that is received by the first UE 402, and the first UE 402 may transmit (or forward) the message to the third UE 406 via sidelink. In another example, the third UE 406 may transmit a message via sidelink that is received by the first UE 402, and the first UE 402 may transmit (or forward) the message to the base station 430 via an uplink transmission. In some such examples, the first UE 402 may be referred to as a "relay" device and the third UE 406 may be referred to as a "remote" device.

In examples disclosed herein, when a UE transmits a transmission for sidelink communication, the transmitting UE may be referred to as a "sidelink transmitting UE" or a "sidelink transmitting device." When a UE receives a transmission via sidelink the receiving UE may be referred to as a "sidelink receiving UE" or a "sidelink receiving device." For example, in the example of FIG. 4, the first UE 402 (e.g., a sidelink transmitting UE) may transmit the transmission 414 via sidelink. The second UE 404 (e.g., a sidelink receiving UE) may receive, via sidelink, a transmission 422 corresponding to the transmission 414.

Figure 5:
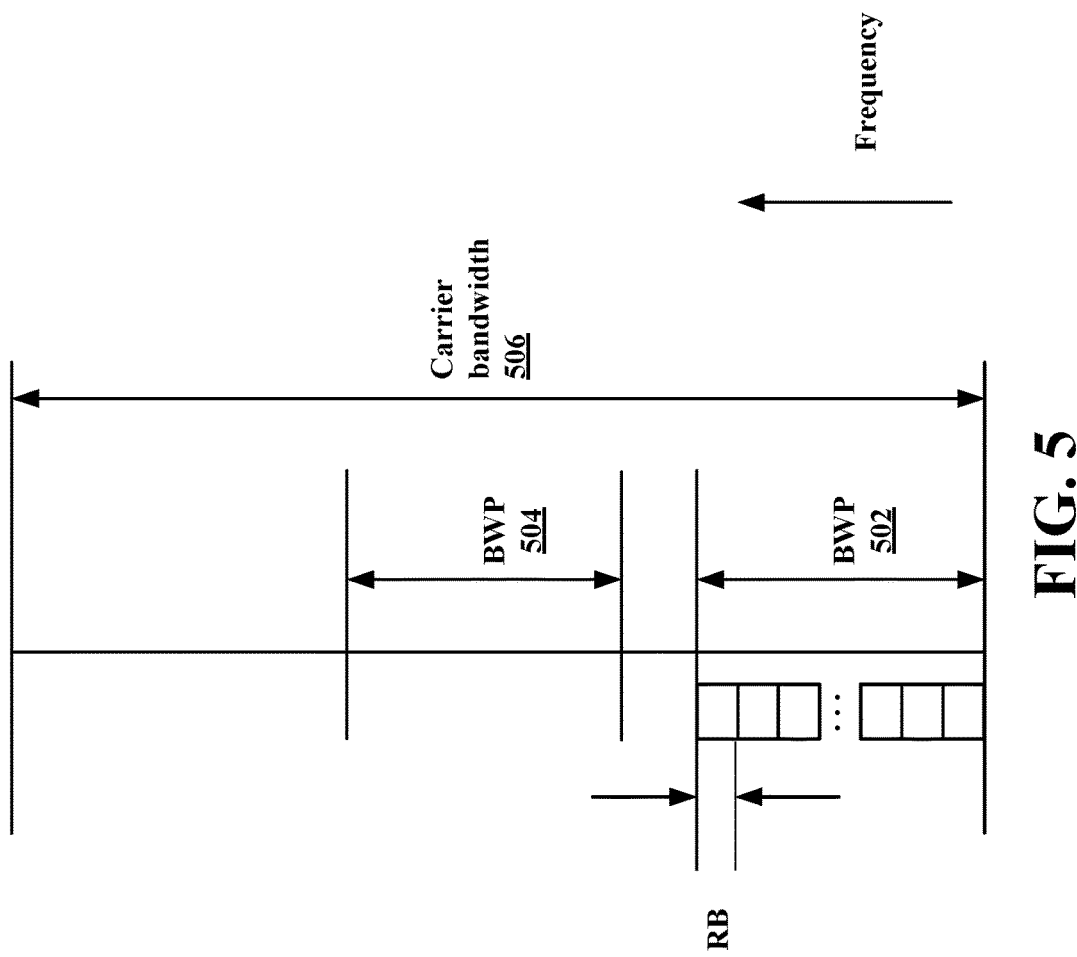
FIG. 5 illustrates an example of frequency resources including multiple BWPs, in accordance with various aspects of the present disclosure.

In cellular link communication between a base station (e.g., the base station 102 or 180) and a UE (e.g., the UE 104) over a Uu link, the UE may achieve power savings through the use of a configured BWP that includes a frequency range that is a portion of a carrier bandwidth. FIG. 5 illustrates an example frequency diagram 500 showing multiple BWPs (e.g., a first BWP 502 and a second BWP 504) within a carrier bandwidth 506. Each BWP includes a set of contiguous physical RBs. The active BWP(s) of the UE may change dynamically over time, e.g., depending on a traffic pattern between the UE and the base station. The use of the BWPs may enable a UE to communicate with the base station over a narrower bandwidth, which may use less power at the UE.

Figure 6:
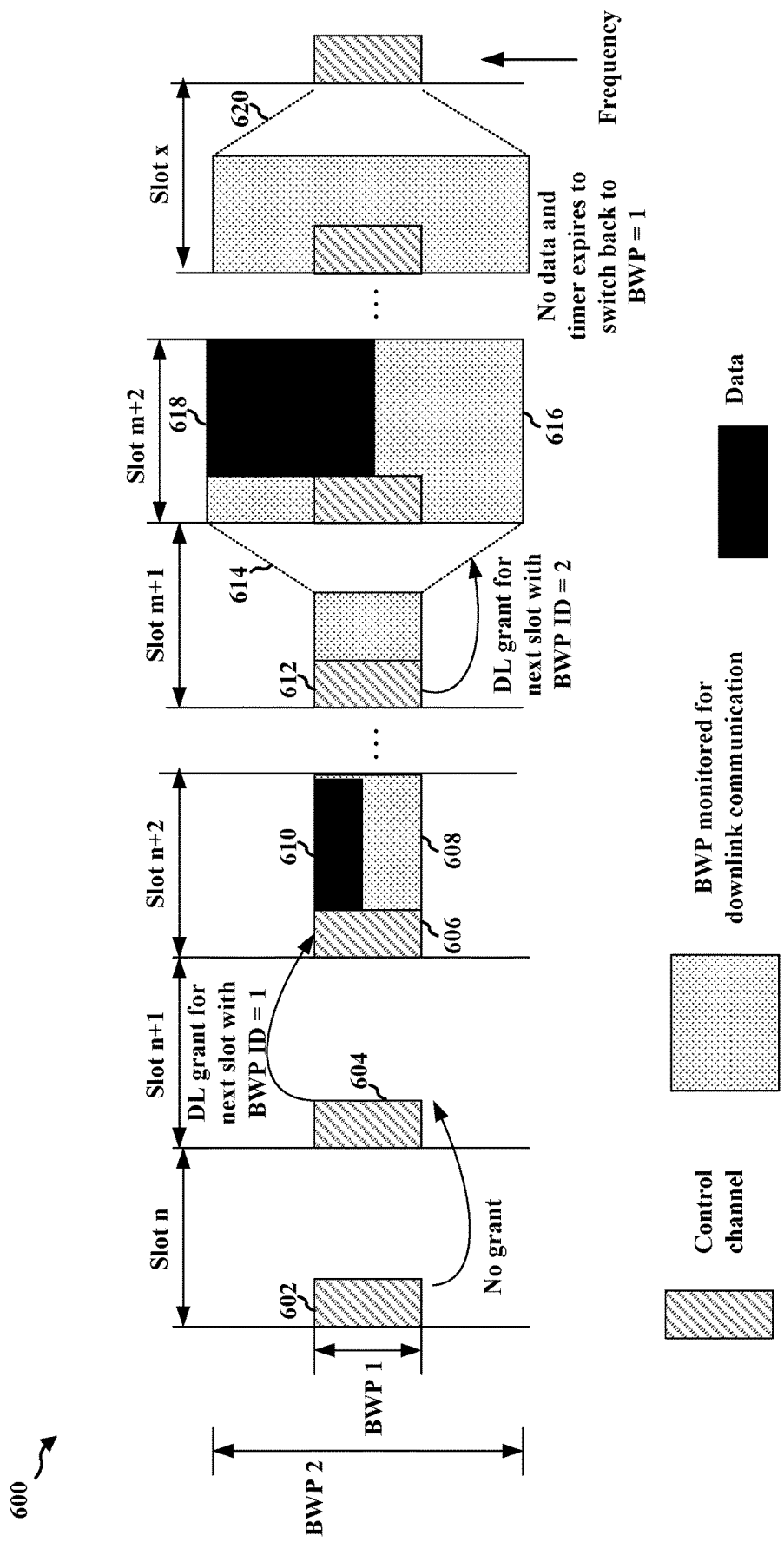
FIG. 6 illustrates example aspects of BWP switching for Uu based communication between a base station and a UE, in accordance with various aspects of the present disclosure.

FIG. 6 illustrates an example 600 of BWP switching for downlink reception by a UE of a downlink transmission from a base station. The UE may monitor a narrower BWP (e.g., a BWP 1) for a control channel transmission 602 from the base station. The control channel transmission 602 does not include a downlink grant for the UE. At a next slot (e.g., at a slot n+1), the UE may receive a downlink grant in a control channel transmission 604, the downlink grant indicating BWP 1 (e.g., "BWP ID=1"). Thus, the UE continues to monitor a narrower bandwidth 608 of BWP 1. The UE may receive a control channel transmission 606 and/or data 610 within the frequency resources of the BWP 1.

In another slot (e.g., a slot m+1 of FIG. 6), the UE may receive a downlink grant in a control channel transmission 612 that indicates a different BWP, e.g., a BWP 2 (e.g., "BWP ID=2"). As illustrated at 614, the UE switches to monitor the indicated BWP, as shown at 616. The UE receives downlink data 618 on frequency resources of BWP 2. The UE may switch back to monitoring the narrower bandwidth of BWP 1. For example, if the UE has not received data and a timer expires, the UE may switch, at 620, back to monitoring BWP 1.

Figure 7:
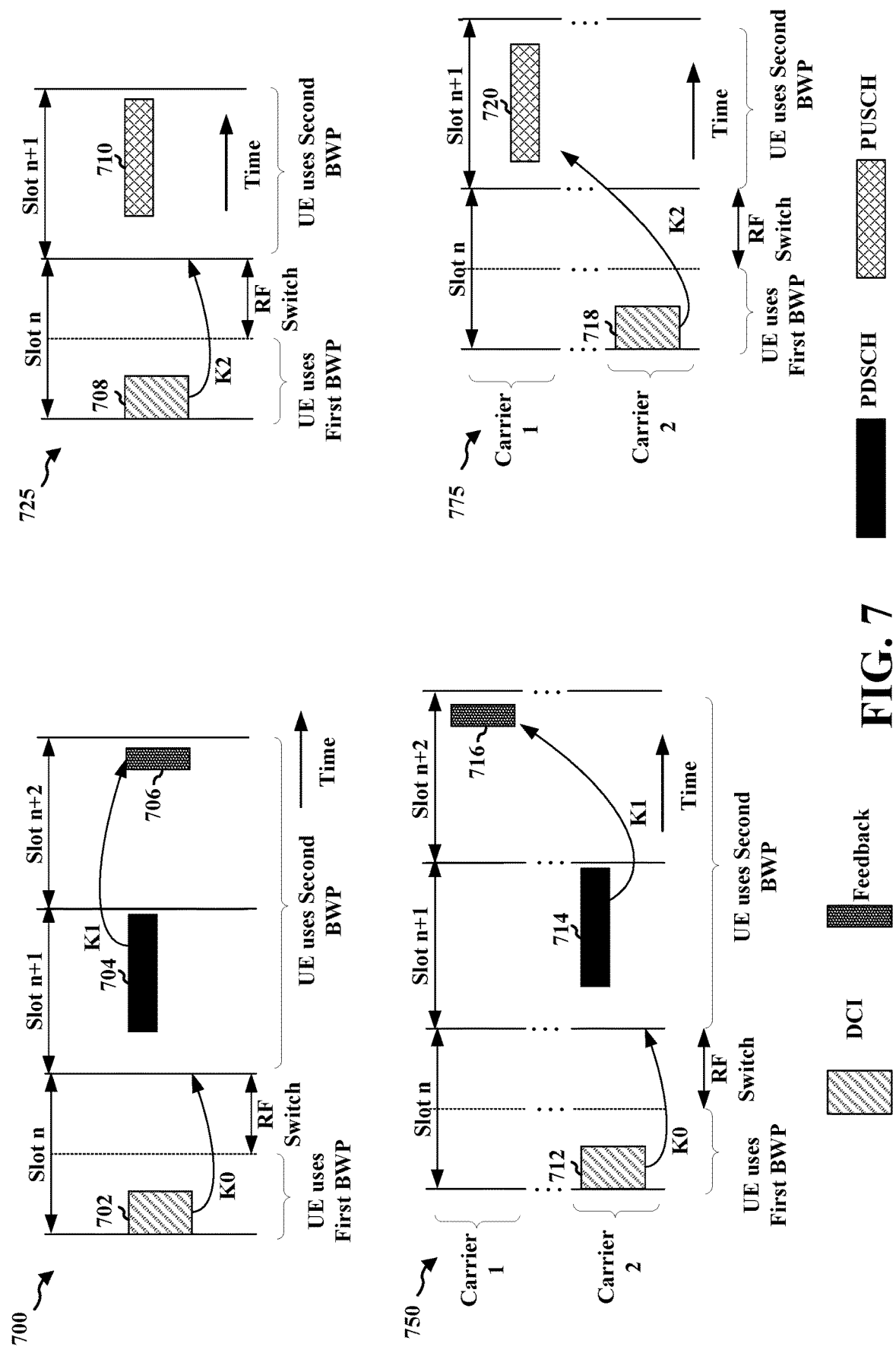
FIG. 7 illustrates example aspects of time division duplex (TDD) BWP switching and frequency division duplex (FDD) BWP switching, in accordance with various aspects of the present disclosure.

FIG. 7 illustrates examples of BWP switching for downlink and uplink transmissions from a UE. In a downlink time division duplex (TDD) example 700, a UE receives downlink control information (DCI) 702 in a first BWP with a downlink grant for the UE to receive PDSCH 704 in a second BWP. The UE performs a BWP switch from the first BWP to the second BWP in order to receive the PDSCH 704. The UE then transmits feedback 706 (e.g., ACK/NACK) in the second BWP. An RF switching latency for the UE to switch from the first BWP to the second BWP may be provided for with a delay parameter (e.g., a k0 parameter) between the DCI 702 and the PDSCH 704 reception. A K1 parameter may provide a delay between the PDSCH 704 reception and the feedback 706.

In a downlink frequency division duplex (FDD) example 750, a UE receives DCI 712 in a first BWP of a first carrier with a downlink grant for the UE to receive PDSCH 714 in a second BWP of the first carrier. The UE performs a BWP switch from the first BWP to the second BWP for the first carrier in order to receive the PDSCH 714. The UE then transmits feedback 716 in a different carrier. The RF switching latency for the UE to switch from the first BWP to the second BWP may be provided for with a delay parameter (e.g., the k0 parameter) between the DCI 712 and the PDSCH 714 reception, similar to the TDD example 700. In the examples 700 and 750, the PDSCH may be in the new BWP, e.g., involving a BWP switch from the BWP in which the DCI with the downlink grant is received. In the TDD example 700, the UE may apply a new DL/UL BWP pair, e.g., transmitting the feedback 706 (ACK) in a new uplink BWP. In the FDD example 750, the UE may receive the PDSCH 714 in the new BWP, and may transmit feedback 716 in a prior uplink BWP.

In an uplink TDD example 725, the UE receives DCI 708, in a first BWP, with an uplink grant for the UE to transmit PUSCH 710 in a second BWP. The UE performs a BWP switch from the first BWP to the second BWP in order to transmit the PUSCH 710. The RF switching latency for the UE to switch from the first BWP to the second BWP may be provided for with a delay parameter (e.g., a k2 parameter) between the DCI 708 and the PUSCH 710 transmission.

In an uplink FDD example 775, the UE may be configured for a first BWP for a first carrier. The UE receives DCI 718, on a second carrier, with an uplink grant for the UE to transmit PUSCH 720 in a second BWP of the first carrier. The UE performs a BWP switch from the first BWP to the second BWP for the first carrier in order to transmit the PUSCH 720. The RF switching latency for the UE to switch from the first BWP to the second BWP on the first carrier may be provided for with a delay parameter (e.g., the k2 parameter) between the DCI 718 and the PUSCH 720 transmission. In the examples 725 and 775, the PUSCH may be transmitted in the new BWP, e.g., involving a BWP switch from the BWP in which the DCI with the uplink grant is received. As illustrated in the FDD examples 750 and 775, the UL and DL BWP may be switched independently.

The size of the DCI in different BWPs may be different due to the different bandwidth sizes of the BWPs. In some examples, a DCI in one BWP may indicate a grant in a different BWP. For example, the DCI may provide for different bandwidths for the control channel with the grant and the data based on the grant.

Figure 8:
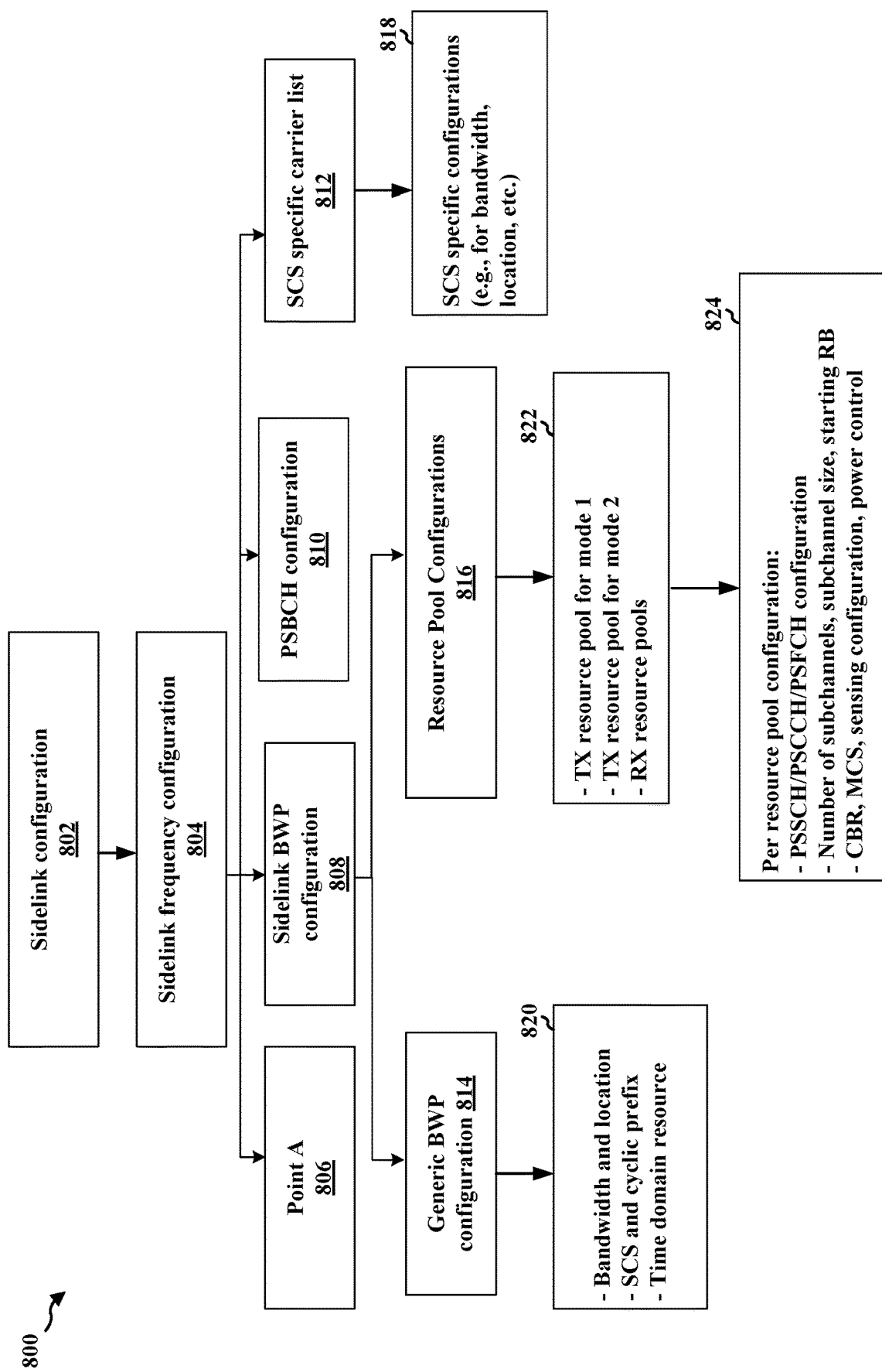
FIG. 8 illustrates an example hierarchy structure for a sidelink configuration include a sidelink BWP configuration, in accordance with various aspects of the present disclosure.

In some examples, a single BWP may be configured within a sidelink carrier. FIG. 8 illustrates an example hierarchy for a configuration for sidelink communication 800 including a sidelink BWP configuration 808. As illustrated in FIG. 8, a sidelink configuration 802 may include a sidelink frequency configuration 804, among other aspects. A sidelink UE may receive the sidelink configuration 802 (e.g., from a base station or another sidelink). In some examples, the sidelink UE may be configured with the sidelink configuration 802. The sidelink frequency configuration 804 may have aspects that correspond to a carrier configuration in Uu-based communication (e.g., cellular communication). The sidelink frequency configuration 804 may include a reference point, e.g., point A 806, a physical sidelink broadcast channel (PSBCH) configuration 810, and/or a subcarrier spacing (SCS) specific carrier list 812. The SCS specific carrier list 812 may include SCS specific configurations 818 for bandwidth, location, etc. The sidelink frequency configuration 804 may include the sidelink BWP configuration 808. The sidelink BWP configuration 808 may include a generic BWP configuration 814. The generic BWP configuration 814 may include one or more parameters 820 such as a bandwidth and frequency location for the generic BWP, an SCS and cyclic prefix (CP) for the generic BWP, and/or one or more time domain resources for the generic BWP. The sidelink BWP configuration 808 may include one or more resource pool configurations 816. Each resource pool configuration 816 may include one or more resource pools 822 for sidelink communication.

A BWP may be wider in the frequency domain than a resource pool, and one BWP may include multiple receiving and transmitting resource pools. For example, FIG. 8 illustrates two transmission resource pools and at least one reception resource pool. As an example, different transmission pools may be configured for different modes of resource allocation. For example, at least one transmission resource pool may be configured for centralized resource allocation (e.g., mode 1 resource allocation in which a base station or other central entity allocates resources to various UEs for sidelink communication). At least one transmission resource pool may be configured for decentralized resource allocation (e.g., mode 2 resource allocation or sensing-based resource allocation in which each UE determines its own transmission resources from the resource pool). The resource pools 822 may further include one or more reception resource pools. Each resource pool may include a resource pool configuration 824 that includes a configuration of one or more of a PSSCH, PSCCH, or PSFCH. Each resource pool configuration 824 may include a number of subchannels, subchannel size, starting RB, a code block rate (CBR), modulation and coding scheme (MCS), sensing configuration (e.g., for mode 2 resource allocation), and/or power control configuration, among others. In some examples, each resource pool configuration may include a maximum number of reception pools and/or transmission pools. For example, a sidelink BWP may include a maximum of sixteen reception pools and a maximum of eight transmission pools. It may be appreciated that in some examples, one or more of the resource pools 822 may comprise a same or overlapping resource allocation.

Aspects presented herein provide for a single BWP of a sidelink carrier to be configured with a primary resource pool and one or more secondary resource pools. The primary resource pool (sometimes referred to as a "default resource pool") may comprise a subset of frequency resources that are activated and configured to provide a minimum bandwidth that the sidelink UE manages and/or monitors. The one or more secondary resource pools may comprise respective subsets of frequency resources that are capable of being activated and deactivated. The activation and deactivation of the resource pools may improve power savings at a sidelink device while also providing different frequency resources for different traffic needs. For example, to accommodate periods with high traffic, one or more secondary resource pools may be activated, thereby increasing the resources available for sidelink communication. To accommodate periods with low or no traffic, one or more secondary resource pools may be deactivated, thereby reducing the resources the sidelink device monitors. Thus, aspects disclosed herein provide techniques for bandwidth adaptation using the activation and deactivation of one or more resource pools within a single BWP of a sidelink carrier.

Figure 9:
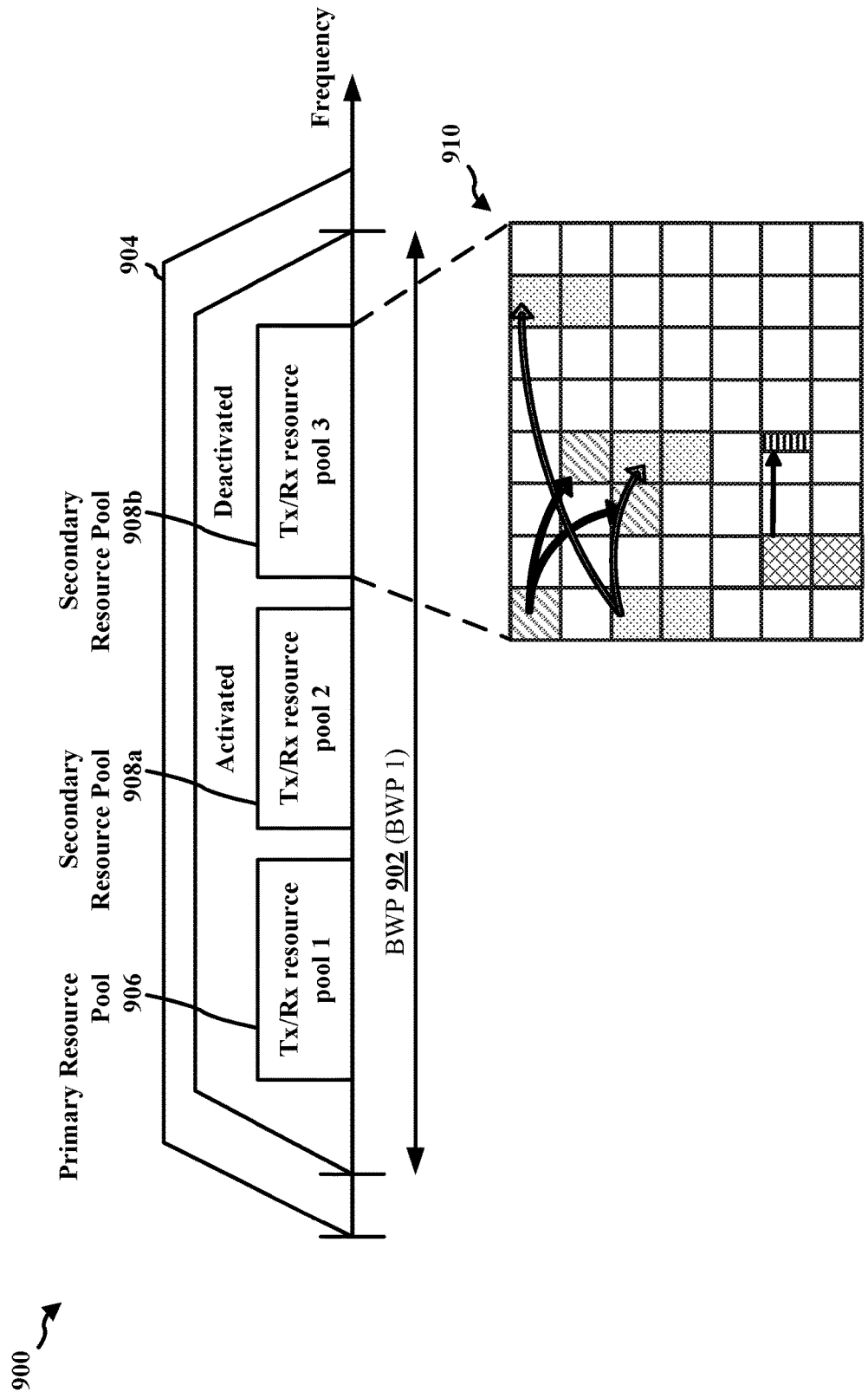
FIG. 9 illustrates a configuration of a single BWP in a carrier for sidelink communication, in accordance with various aspects of the present disclosure.

FIG. 9 illustrates a configuration 900 of a single BWP 902 (e.g., a BWP 1) in a carrier 904 for sidelink communication. In some examples, a sidelink UE (e.g., the UE 104 and/or the UEs 402, 404, 406, 408) may receive the configuration 900 from a wireless communication device, such as a base station or a sidelink transmitting UE. In some examples, the sidelink UE may be configured with the configuration 900.

The example BWP 902 includes three resource pools (e.g., a resource pool 1, a resource pool 2, and a resource pool 3). Each of the resource pools may be associated with a respective subset of frequency resources. For example, in the configuration 900, the resource pool 3 comprises a subset of frequency resources 910.

To maintain a minimum bandwidth to enable a sidelink UE to manage and/or monitor sidelink communication, the configuration 900 configures (e.g., defines) a primary resource pool 906 of the BWP 902 (e.g., the resource pool 1). The primary resource pool 906 provides the minimum bandwidth (e.g., subset of frequency resources) to enable the sidelink UE to receive and/or transmit sidelink communication. In some examples, the primary resource pool 906 may be unable to be deactivated. That is, the sidelink UE may monitor at least the resources associated with the primary resource pool 906 when monitoring for sidelink communication, regardless of whether one or more additional resource pools are activated or deactivated.

To facilitate BWP adaptation, the configuration 900 of the BWP 902 also defines one or more secondary resource pools that may be activated and deactivated. For example, the configuration 900 configures (e.g., defines) a first secondary resource pool 908a (e.g., the resource pool 2) and a second secondary resource pool 908b (e.g., the resource pool 3). When the configuration 900 is initiated, the secondary resource pools 908a, 908b may be deactivated. While managing sidelink communication, the secondary resource pools 908a, 908b may be activated or deactivated based on instantaneous traffic needs. For example, when traffic increases, one or both of the secondary resource pools 908a, 908b may be activated. When traffic decreases, one or both of the active secondary resource pools 908a, 908b may be deactivated. In this manner, the sidelink UE may adapt the bandwidth being managed and/or monitored and, thus, conserve power by reducing the resources/subchannels that the sidelink UE monitors during periods of low traffic.

The secondary resource pools 908a, 908b may be activated through signaling from an activating device. For example, a sidelink UE may receive an activation indication activating the first secondary resource pool 908a via layer 1 signaling, such as control information or a wake-up signal. As shown in FIG. 9, an activation indication activates the first secondary resource pool 908a. In some examples, the sidelink UE may receive an activation indication activating the first secondary resource pool 908a via layer 2 signaling, such as a medium access control (MAC) control element (MAC-CE) or RRC signaling. The sidelink UE may receive the activation indication activating the first secondary resource pool 908a via a resource of the primary resource pool 906. That is, since the sidelink receiving UE monitors at least the resources associated with the primary resource pool 906, the sidelink receiving UE is capable of receiving an activation indication regardless of the activated/deactivated status of the secondary resource pools 908a, 908b. However, it may be appreciated that when at least one of the secondary resource pools 908a, 908b is/are activated, the sidelink receiving UE may receive the activation indication via resources associated with the primary resource pool 906 and/or resources associated with the activated one(s) of the secondary resource pools 908a, 908b.

In a first aspect, the activating device may comprise a base station, such as the base station 430 of FIG. 4. For example, the base station may receive information regarding upcoming traffic and signal to a sidelink device (e.g., a sidelink transmitting device and/or a sidelink receiving device) to activate one or more secondary resource pools. In some examples, the base station may signal to a sidelink receiving device to activate to one or both of the secondary resource pools 908a, 908b by transmitting a downlink activation indication to the sidelink receiving UE. For example, and referring to the example of FIG. 4, the base station 430 may signal to the second UE 404 to activate the first secondary resource pool 908a by transmitting a downlink activation indication (e.g., the transmission 434). In such examples, the layer 1 signaling comprising the downlink activation indication from the base station may include DCI or a downlink wake-up signal. Layer 2 signaling comprising the downlink activation indication from the base station may include a downlink MAC-CE or downlink RRC signaling.

In another aspect, the activating device may comprise a sidelink transmitting UE, such as the first UE 402 of FIG. 4. For example, and referring to the example of FIG. 4, the first UE 402 may transmit a sidelink activation indication (e.g., the transmission 414) to the second UE 404 of FIG. 4 to activate the first secondary resource pool 908a. In such examples, the layer 1 signaling comprising the sidelink activation indication from the sidelink transmitting UE may include SCI or a sidelink wake-up signal. Layer 2 signaling comprising the sidelink activation indication from the sidelink transmitting UE may include a sidelink MAC-CE or sidelink RRC signaling.

In some examples, the sidelink transmitting UE may determine to transmit the sidelink activation indication to the sidelink receiving UE based on information regarding upcoming sidelink traffic. In some examples, the sidelink transmitting UE may transmit the sidelink activation indication to the sidelink receiving UE based on a downlink activation indication received from a base station. For example, and referring to the example of FIG. 4, the base station 430 may receive information regarding upcoming traffic and signal to the first UE 402 (e.g., via the transmission 434) to activate the first secondary resource pool 908a. The first UE 402 may activate the first secondary resource pool 908a based on the signaling received from the base station 430. The first UE 402 may also transmit the sidelink activation indication to the second UE 404 (e.g., via the transmission 414) to cause the second UE 404 to activate the first secondary resource pool 908a based on the signaling received by the first UE 402 from the base station 430. The first UE 402 may transmit the sidelink activation indication to the second UE 404 via resources associated with the primary resource pool 906. In some such examples, the first UE 402 (e.g., the sidelink transmitting UE or "relay" device) may help connect the second UE 404 (e.g., the sidelink receiving UE or "remote" device) to the base station 430 by relaying traffic between the second UE 404 and the base station 430.

In some examples, the signaling received by the sidelink transmitting UE to activate the secondary resource pool(s) from the base station may comprise DCI. In some such examples, the DCI may schedule a sidelink grant in the secondary resource pool. For example, the base station may transmit a DCI format 3_x (e.g., DCI format 3_0 or DCI format 3_1) to indicate to the sidelink transmitting UE to activate the first secondary resource pool 908a for sidelink communication. The DCI format 3_x may also schedule a sidelink grant indicating a set of frequency resources of the first secondary resource pool 908a for the sidelink transmitting UE to use for transmitting sidelink communications to the sidelink receiving UE.

After the sidelink UEs activate one or more secondary resource pools (e.g., based on the downlink activation indication from the base station or the sidelink activation indication from the sidelink transmitting UE), the sidelink receiving UE may receive sidelink communication from the sidelink transmitting UE. When managing sidelink communication, the sidelink receiving UE may monitor the subset of frequency resources associated with the resource pool(s) that are activated. For example, in the example of FIG. 9, when the configuration 900 is initiated, the sidelink receiving UE may monitor for sidelink communication in the subset of frequency resources of the primary resource pool 906, since the primary resource pool 906 is activated and the secondary resource pools 908a, 908b are deactivated. After the sidelink receiving UE activates the one or more secondary resource pools (e.g., the first secondary resource pool 908a in the example of FIG. 9), the sidelink receiving UE may monitor for sidelink communication in the subset of frequency resources of the BWP 902 of the carrier 904 associated with the primary resource pool 906 and the first secondary resource pool 908a.

The sidelink UEs may continue sidelink communication using the active secondary resource pool(s) until a deactivation event is detected. In some examples, the deactivation event may include a deactivation indication. For example, the sidelink receiving UE may receive the deactivation indication based on a decrease in sidelink traffic. In a similar manner as the activation indication, the sidelink UEs may receive a deactivation indication from a sidelink transmitting UE or the base station. For example, a sidelink UE may receive a downlink deactivation indication from the base station (e.g., DCI, a downlink wake-up signal, a downlink MAC-CE, and/or downlink RRC signaling) or from the sidelink transmitting UE (e.g., SCI, a sidelink wake-up signal, a sidelink MAC-CE, and/or sidelink RRC signaling).

In some examples, the deactivation event may be based on a timer. For example, an active secondary resource pool may be deactivated if a threshold amount of traffic is not received or transmitted on the active secondary resource pool for a period (e.g., a deactivation period). In some examples, the threshold amount of traffic may correspond to zero traffic. For example, if no traffic is transmitted or received on the active secondary resource pool for the period, then the active secondary resource pool may be deactivated. In some examples, the threshold amount of traffic may be greater than zero traffic. For example, if the amount of traffic received or transmitted for the period is greater than zero traffic and less than the threshold amount of traffic, then the active secondary resource pool may be deactivated.

In some examples, the sidelink UE may initiate a timer (e.g., a deactivation timer) when a secondary resource pool is activated. The sidelink UE may reset the deactivation timer each time traffic (e.g., the threshold amount of traffic) is received or transmit on the active resource pool. In some such examples, when the deactivation timer expires (e.g., the threshold amount of traffic is not received or transmitted while the deactivation timer is active), the sidelink UE deactivates the active resource pool.

In some examples, an activation indication may activate multiple secondary resource pools. For example, an activation indication may activate the first secondary resource pool 908a and the second secondary resource pool 908b. In some examples, a deactivation indication may deactivate multiple secondary resource pools. For example, a deactivation indication may deactivate the first secondary resource pool 908a and the second secondary resource pool 908b (e.g., when the secondary resource pools 908a, 908b are active). It may be beneficial to activate and/or deactivate one or more resource pools using a same signaling to reduce signaling overhead.

In some examples, an activation indication or a deactivation indication may activate one or more resource pools and deactivate one or more resource pools. For example, after the first secondary resource pool 908a is activated, an activation indication (or a deactivation indication) may activate the second secondary resource pool 908b and deactivate the first secondary resource pool 908a. For example, the first secondary resource pool 908a may experience increased interference and, thus, it may be beneficial to switch to activating the second secondary resource pool 908b. In some aspects, the respective secondary resource pools 908a, 908b may comprise different amounts of resources. For example, the first secondary resource pool 908a may comprise fewer resources than the second secondary resource pool 908b. In some such examples, when an increase in traffic is upcoming, the first secondary resource pool 908a may be activated, but when an additional increase in traffic is detected, it may be beneficial to switch to the second secondary resource pool 908b for the sidelink communication (e.g., by activating the second secondary resource pool 908b and deactivating the first secondary resource pool 908a).

Figure 10:
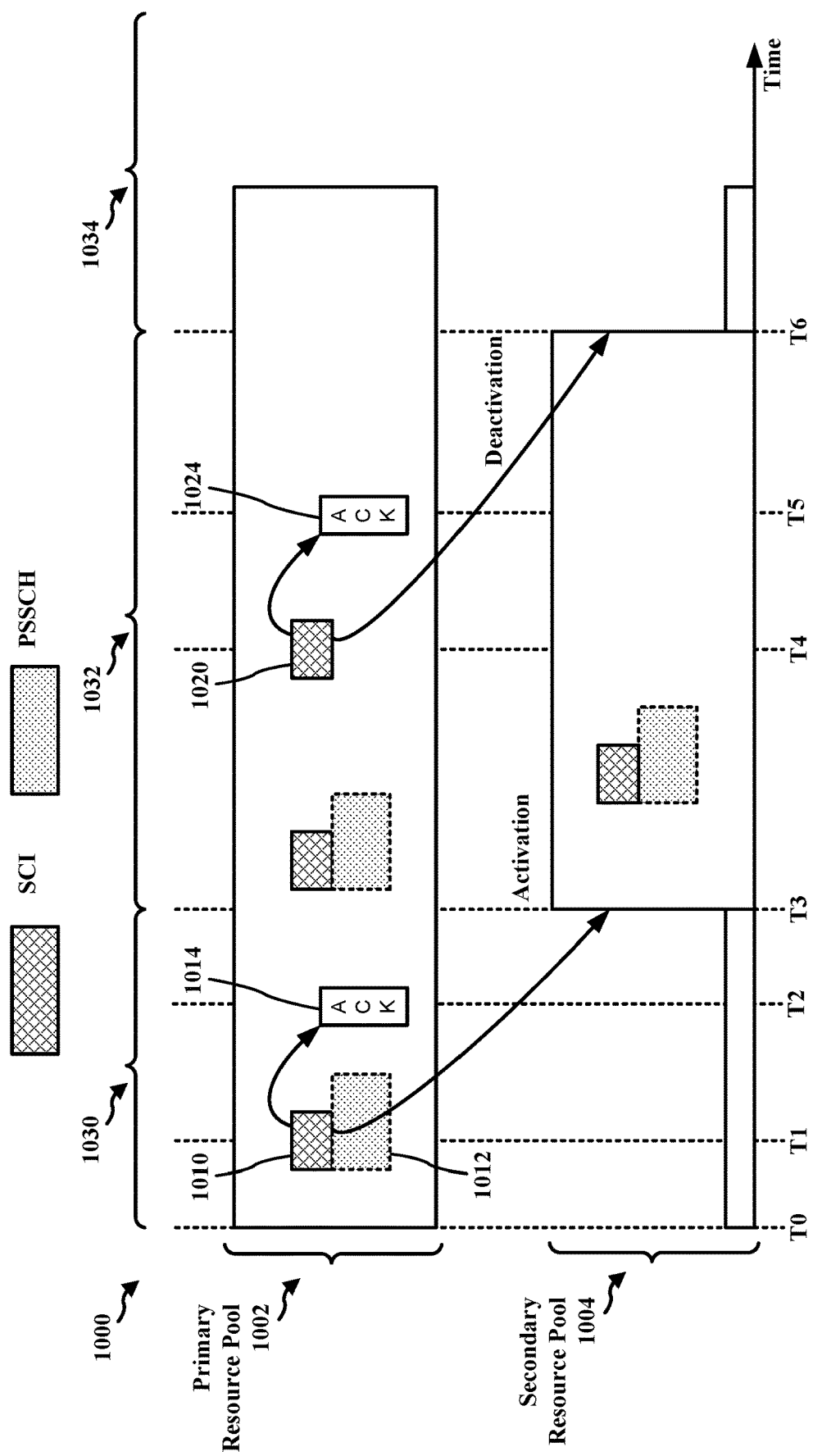
FIG. 10 illustrates an example timing of resource pool activation and deactivation of a secondary resource pool via sidelink signaling, in accordance with various aspects of the present disclosure.

FIG. 10 illustrates an example timing 1000 of resource pool activation and deactivation of a secondary resource pool 1004 via sidelink signaling, as presented herein. The signaling (e.g., layer 1 signaling, such as SCI or a sidelink wake-up signal, or layer 2 signaling, such as a sidelink MAC-CE or sidelink RRC signaling) may comprise an activation indication and/or a deactivation indication.

As shown in FIG. 10, the activating of the secondary resource pool 1004 occurs after SCI 1010 and ACK 1014. For example, at time T0, a primary resource pool 1002 is activate and the secondary resource pool 1004 is deactivated. Aspects of the primary resource pool 1002 may be implemented by the primary resource pool 906 of FIG. 9. Aspects of the secondary resource pool 1004 may be implemented by the first secondary resource pool 908a of FIG. 9. At time T1, a sidelink UE receives or transmits the SCI 1010 activating the secondary resource pool 1004. At time T3, the secondary resource pool 1004 is activated. At time T4, the sidelink UE receives or transmits SCI 1020 deactivating the secondary resource pool 1004. At time T6, the secondary resource pool 1004 is deactivated.

In the example of FIG. 10, a sidelink UE may monitor for and/or manage sidelink communication using the frequency resources associated with active resource pools. For example, between time T0 and time T3 (e.g., a first interval 1030), the sidelink transmitting UE may transmit sidelink communication to the sidelink receiving UE using the frequency resources associated with the primary resource pool 1002. The receiving UE may monitor for sidelink communication from the sidelink transmitting UE using the frequency resources associated with the primary resource pool 1002 for the first interval 1030. Between the time T3 and time T6 (e.g., a second interval 1032), the sidelink transmitting UE may transmit sidelink communication to the sidelink receiving UE using the frequency resources associated with the primary resource pool 1002 and/or the secondary resource pool 1004. The sidelink receiving UE may monitor for sidelink communication from the sidelink transmitting UE using the frequency resources associated with the primary resource pool 1002 and/or the secondary resource pool 1004 for the second interval 1032. After the time T6 (e.g., a third interval 1034), the sidelink transmitting UE may transmit sidelink communication to the sidelink receiving UE using the frequency resources associated with the primary resource pool 1002. The sidelink receiving UE may monitor for sidelink communication from the sidelink transmitting UE using the frequency resources associated with the primary resource pool 1002 for the third interval 1034. Thus, the sidelink receiving UE may conserve power by monitoring the frequency resources associated with the primary resource pool 1002 and not the frequency resources associated with the secondary resource pool 1004 for the first interval 1030 and the third interval 1034. The first interval 1030 and the third interval 1034 may be associated with little or no traffic (e.g., less than a threshold amount of traffic) and the second interval 1032 may be associated with high traffic (e.g., greater than a threshold amount of traffic).

Activation indications and deactivation indications may be transmitted and received in active resource pools. For example, for the first interval 1030, the SCI 1010 comprising an activation indication to activate the secondary resource pool 1004 is transmitted and received on resources associated with the primary resource pool 1002. For the second interval 1032, an activation indication (e.g., activating a different secondary resource pool) or a deactivation indication (e.g., deactivating the secondary resource pool 1004) may be transmitted and received on resources associated with the primary resource pool 1002 or the secondary resource pool 1004. For the third interval 1034, an activation indication to activate the secondary resource pool 1004 may be transmitted and received on resources associated with the primary resource pool 1002.

In some examples, the activating and/or deactivating of a secondary resource pool may occur after feedback. For example, a sidelink transmitting UE may activate the secondary resource pool 1004 by transmitting the SCI 1010 to a sidelink receiving UE (e.g., at the time T1). As shown in FIG. 10, the activating of the secondary resource pool 1004 does not occur until after the sidelink receiving UE transmits a feedback message (e.g., the ACK 1014) at the time T2. The sidelink receiving UE may transmit the ACK 1014 using a sidelink feedback channel (e.g., PSFCH). In a similar manner, the sidelink transmitting UE may deactivate the secondary resource pool 1004 by transmitting the SCI 1020 to the sidelink receiving UE (e.g., at the time T4). As shown in FIG. 10, the deactivating of the secondary resource pool 1004 does not occur until after the sidelink receiving UE transmits a feedback message (e.g., ACK 1024) at time T5. Thus, it may be appreciated that there may be a delay between the time at which an activation indication and/or deactivation indication is transmitted and the time at which the corresponding resource pool is activated or deactivated. In some examples, the sidelink receiving UE may transmit the feedback message using a sidelink MAC-CE. For example, the sidelink MAC-CE may be used to acknowledge the activation of a resource pool (e.g., the ACK 1014 acknowledging the activating of the secondary resource pool 1004) and/or acknowledge the deactivation of a resource pool (e.g., the ACK 1024 acknowledging the deactivating of the secondary resource pool 1004).

In some examples, the feedback message (e.g., the ACK 1014, 1024) may be based on the SCI. For example, the SCI activating and/or deactivating the secondary resource pool may or may not schedule a data transmission (e.g., PSSCH 1012). If the SCI activating and/or deactivating the secondary resource pool foregoes scheduling a data transmission (e.g., the SCI 1020), the feedback message (e.g., the ACK 1024) may acknowledge whether the sidelink receiving UE received the SCI. If the SCI activating and/or deactivating the secondary resource pool schedules a data transmission (e.g., the SCI 1010), the feedback message (e.g., the ACK 1014) may be based on the decoding of the data transmission and acknowledge receipt of the SCI. When the SCI activating and/or deactivating the secondary resource pool schedules a data transmission, the sidelink receiving UE may activate and/or deactivate the secondary resource pool regardless of whether the sidelink receiving UE successfully decodes the data transmission scheduled by the SCI.

In some examples, the sidelink UEs may perform bi-directional sidelink communications. In such examples, each sidelink UE may signal to the other sidelink UE whether to activate and/or deactivate a respective secondary resource pool. For example, a first sidelink UE may transmit an activation indication to a second sidelink UE to activate a secondary resource pool. The second sidelink UE may then proceed to monitor the primary resource pool and the secondary resource pool for sidelink communications from the first sidelink UE. The second sidelink UE may also determine to transmit sidelink communications to the first sidelink UE and transmit an activation indication to the first sidelink UE to activate the secondary resource pool. In such examples, the first sidelink UE may start monitoring the primary resource pool and the secondary resource pool for sidelink communication from the second sidelink UE. In a similar manner, each of the sidelink UEs may transmit a deactivation indication to the other sidelink UE to cause the other sidelink UE to deactivate the secondary resource pool.

It may be appreciated that in some examples, each of the sidelink UEs may activate a different resource pool for the bi-directional sidelink communication. For example, the first sidelink UE may transmit an activation indication activating a first secondary resource pool and the second sidelink UE may transmit an activation indication activating a second secondary resource pool. In some such examples, the first sidelink UE may transmit a sidelink communication to the second sidelink UE using the resources associated with the primary resource pool and the first secondary resource pool, and the first sidelink UE may monitor for sidelink communication from the second sidelink UE on the resources associated with the primary resource pool and the second secondary resource pool. In a similar manner, the second sidelink UE may transmit a sidelink communication to the first sidelink UE using the resources associated with the primary resource pool and the second secondary resource pool, and the second sidelink UE may monitor for sidelink communication from the first sidelink UE on the resources associated with the primary resource pool and the first secondary resource pool.

In some examples, an activation indication activating a secondary resource pool transmit by a first sidelink UE enables bi-directional sidelink communication by both of the UEs using the resources associated with the primary resource pool and the secondary resource pool. For example, when the first sidelink UE transmits an activation indication to a second sidelink UE, the first sidelink UE may also start monitoring for sidelink communication from the second sidelink UE on the resources of the primary resource pool and the secondary resource pool. In some examples, either of the sidelink UEs may deactivate the secondary resource pool for bi-directional sidelink communication by transmitting a deactivation indication to the other sidelink UE. In some examples, each of the sidelink UEs may transmit a deactivation indication to the other sidelink UE to cause the other sidelink UE to deactivate the secondary resource pool. For example, the first sidelink UE may transmit a deactivation indication to the second sidelink UE to cause the second sidelink UE to deactivate the secondary resource pool and to cause the second sidelink UE to stop monitoring the resources associated with the secondary resource pool. In some such examples, the first sidelink UE may continue monitoring the resources associated with the secondary resource pool for sidelink communication from the second sidelink UE (e.g., until the first sidelink UE receives a deactivation indication for the secondary resource pool from the second sidelink UE).

Figure 11:
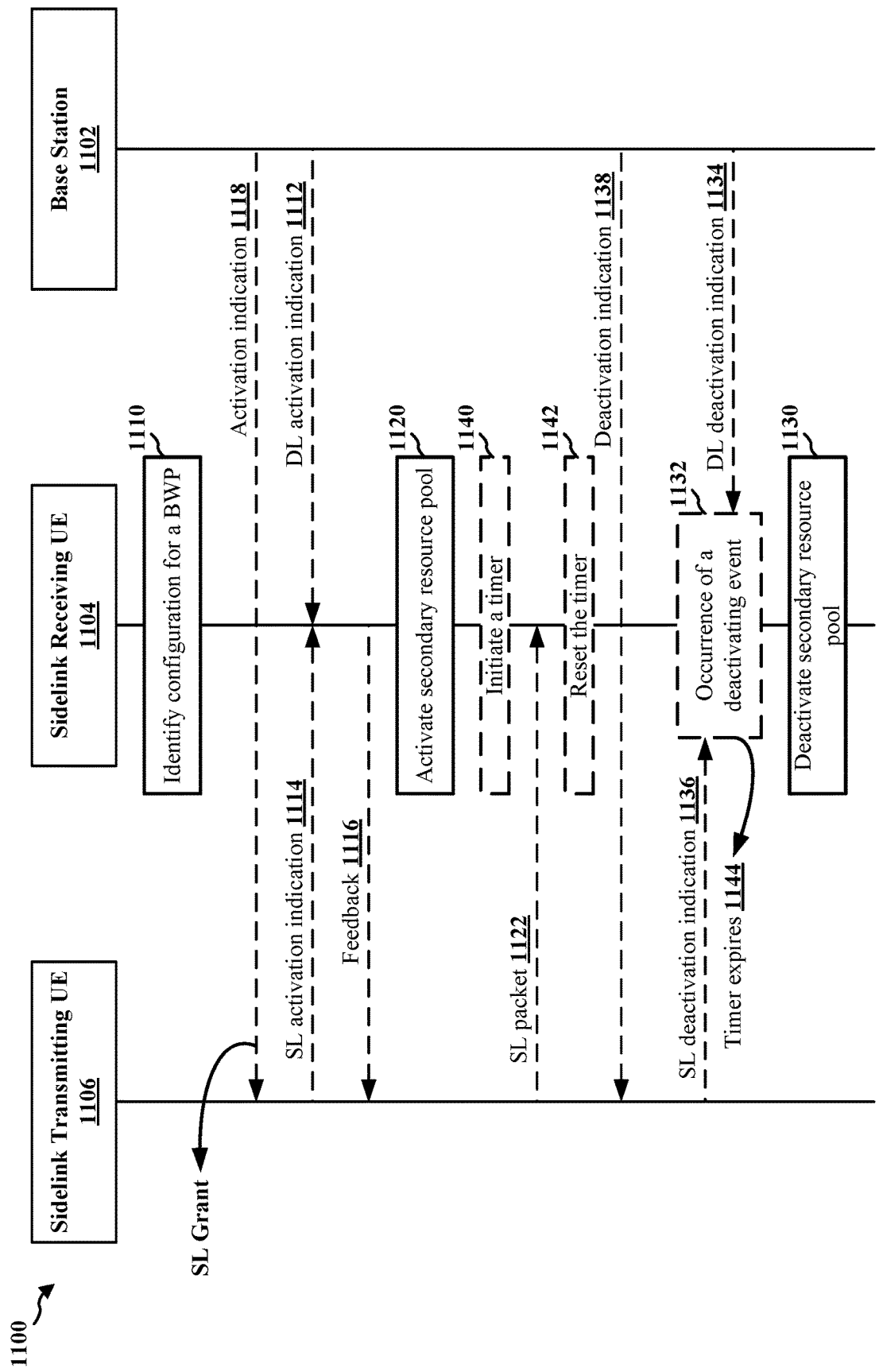
FIG. 11 is an example communication flow between a sidelink receiving UE, a sidelink transmitting UE, and a base station, in accordance with the teachings disclosed herein.

FIG. 11 illustrates an example communication flow 1100 between a base station 1102, a sidelink receiving UE 1104, and a sidelink transmitting UE 1106, as presented herein. In the illustrated example, the communication flow 1100 facilitates activating and deactivating resource pools of a single BWP of a sidelink carrier. Aspects of the base station 1102 may be implemented by the base station 102/180 of FIG. 1, the first wireless communication device 310 of FIG. 3, and/or the base station 430 of FIG. 4. Aspects of the sidelink receiving UE 1104 may be implemented by the UE 104 of FIG. 1, the wireless communication devices 310, 350 of FIG. 3, and/or the first UE 402 of FIG. 4. Aspects of the sidelink transmitting UE 1106 may be implemented by the UE 104 of FIG. 1, the wireless communication devices 310, 350 of FIG. 3, and/or the second UE 404 of FIG. 4. Although not shown in the illustrated example of FIG. 11, it may be appreciated that in additional or alternative examples, the base station 1102 may be in communication with one or more other base stations or UEs, and/or the sidelink UEs 1104, 1106 may be in communication with one or more other base stations or UEs.

At 1110, the sidelink receiving UE 1104 identifies a configuration of a BWP for sidelink communication. In the illustrated example, the sidelink communication may be between the sidelink receiving UE 1104 and the sidelink transmitting UE 1106. For example, the sidelink transmitting UE 1106 may transmit a sidelink communication that is received by the sidelink receiving UE 1104. Aspects of the configuration of the BWP may be implemented by the configuration 900 of FIG. 9. For example, the configuration of the BWP may include the primary resource pool 906 and one or more secondary resource pools (e.g., the secondary resource pools 908a, 908b). The primary resource pool 906 may comprise activated frequency resources corresponding to a minimum bandwidth to facilitate sidelink management and/or monitoring. The secondary resource pools 908a, 908b may comprise frequency resources that are capable of being activated and deactivated. A secondary resource pool may be activated to increase bandwidth (e.g., to accommodate periods of increased sidelink traffic). An active secondary resource pool may be deactivated when sidelink traffic decreases. Deactivating a secondary resource pool reduces the bandwidth that the sidelink UE monitors for sidelink communication, thereby enabling power savings.

In some examples, the sidelink receiving UE 1104 may identify the configuration based on information provided by the base station 1102 and/or the sidelink transmitting UE 1102. In some examples, the sidelink receiving UE 1104 may be configured with the configuration (e.g., pre-configured).

As described above, a secondary resource pool may be activated to increase resources available for sidelink communication. A secondary resource pool may be activated based on an indication. In one aspect, the sidelink receiving UE 1104 may receive an indication from the base station 1102. For example, the base station 1102 may receive information indicating an increase in sidelink communication and, thus, may facilitate activating a secondary resource pool for sidelink communication. The base station 1102 may transmit a downlink activation indication 1112 that is received by the sidelink receiving UE 1104. The base station 1102 may transmit the downlink activation indication 1112 on a frequency resource of a downlink channel, such as a downlink control channel (e.g., a PDCCH) and/or a downlink data channel (e.g., a PDSCH). In some examples, the base station 1102 may transmit the downlink activation indication 1112 on a resource of the primary resource pool. The downlink activation indication 1112 may comprise layer 1 signaling and/or layer 2 signaling. For example, the downlink activation indication 1112 may comprise DCI (e.g., DCI format 3_x), a downlink wake-up signal, a downlink MAC-CE, and/or downlink RRC signaling.

In a second aspect, the sidelink receiving UE 1104 may receive an indication from the sidelink transmitting UE 1106. For example, the sidelink transmitting UE 1106 may determine an increase in sidelink communication and, thus, may facilitate activating a secondary resource pool for sidelink communication. The sidelink transmitting UE 1106 may transmit a sidelink activation indication 1114 that is received by the sidelink receiving UE 1104. The sidelink transmitting UE 1106 may transmit the sidelink activation indication 1114 on a resource of an active resource pool. For example, and referring to the example of FIG. 10, for the first interval 1030 and/or the third interval 1034, the sidelink transmitting UE 1106 may transmit the sidelink activation indication 1114 on a resource of the primary resource pool 1002. For the second interval 1032, the sidelink transmitting UE 1106 may transmit the sidelink activation indication 1114 on a resource of the primary resource pool 1002 and/or a resource of the secondary resource pool 1004.

The sidelink activation indication 1114 may comprise layer 1 signaling and/or layer 2 signaling. For example, the sidelink activation indication 1114 may comprise SCI, a sidelink wake-up signal, a sidelink MAC-CE, and/or sidelink RRC signaling.

In some examples, the sidelink activation indication 1114 may comprise SCI that schedules the sidelink receiving UE 1104 to transmit a feedback message 1116 (e.g., an ACK or NACK) to the sidelink transmitting UE 1106. Aspects of the feedback message 1116 may be implemented by the ACK 1014, 1024 of FIG. 10. For example, the feedback message 1116 may acknowledge receipt of the sidelink activation indication 1114 when the corresponding SCI foregoes scheduling a data transmission (e.g., the SCI 1020 of FIG. 10). When the SCI schedules a data transmission (e.g., the SCI 1010 scheduling the PSSCH 1012), the feedback message 1116 may acknowledge receipt of the sidelink activation indication 1114 and/or whether the sidelink receiving UE 1104 successfully received the data transmission (e.g., the PSSCH 1012). The sidelink receiving UE 1104 may transmit the feedback message 1116 to the sidelink transmitting UE 1106 using a sidelink feedback channel (e.g., a PSFCH) and/or a sidelink MAC-CE acknowledging the activation (or deactivation) of the secondary resource pool.

In another aspect, aspects of the first aspect and the second aspect may be implemented. For example, the base station 1102 may transmit an activation indication 1118 that is received by the sidelink transmitting UE 1106. The base station 1102 may transmit the activation indication 1118 to the sidelink transmitting UE 1106 based on information indicating an increase in sidelink communication. Similar to the downlink activation indication 1112, the activation indication 1118 may comprise layer 1/layer 2 signaling, such as DCI, a downlink wake-up signal, a downlink MAC-CE, and/or downlink RRC signaling. In some such examples, the sidelink transmitting UE 1106 may transmit the sidelink activation indication 1114 to the sidelink receiving UE 1104 based on the activation indication 1118.

In some examples, the activation indication 1118 may comprise DCI (e.g., DCI format 3_x). The base station 1102 may use DCI format 3_x (e.g., 3_0 or 3_1) to indicate the activation of the secondary resource pool (e.g., for the sidelink transmitting UE 1106) and may schedule a SL grant indicating a set of frequency resources in the secondary resource pool for the sidelink transmitting UE 1106 to transmit one or more sidelink packets to the sidelink receiving UE 1104.

At 1120, the sidelink receiving UE 1104 activates the secondary resource pool based on an activation indication (e.g., the downlink activation indication 1112 or the sidelink activation indication 1114). Aspects of activating the secondary resource pool may be implemented for the second interval 1032 of FIG. 10. Activating the secondary resource pool increases the resources available for receiving sidelink communication (e.g., sidelink packets) at the sidelink receiving UE 1104.

For example, the sidelink transmitting UE 1106 may transmit a sidelink packet 1122 that is received by the sidelink receiving UE 1104. The sidelink transmitting UE 1106 may transmit the sidelink packet 1122 on a resource of an active resource pool. For example, for the second interval 1032, the sidelink transmitting UE 1106 may transmit sidelink communications to the sidelink receiving UE 1104 on resources of the primary resource pool 1002 and/or resources of the secondary resource pool 1004. The sidelink packet 1122 may comprise one or more sidelink packets including control information and/or data. Although shown as a single transmission in the example of FIG. 11, it may be appreciated that the sidelink packet 1122 may comprise one or more transmissions.

In some examples, the sidelink receiving UE 1104 activates the secondary resource pool (e.g., at 1120) based on the feedback message 1116. For example, when the sidelink activation indication 1114 comprises SCI, the SCI may or may not schedule a data transmission. When the SCI does not schedule a data transmission (e.g., the SCI 1020 of FIG. 10), the feedback message 1116 may comprise an ACK when the sidelink receiving UE 1104 successfully decodes the SCI. The feedback message 1116 may comprise a NACK when the sidelink receiving UE 1104 is unable to decode the SCI. In such examples, the sidelink receiving UE 1104 may activate the secondary resource pool (e.g., at 1120) when the feedback message 1116 comprises an ACK and may forego activating the secondary resource pool when the feedback message 1116 comprises a NACK.

When the SCI schedules a data transmission (e.g., the SCI 1010 of FIG. 10), the feedback message 1116 may comprise an ACK when the sidelink receiving UE 1104 successfully decodes the data transmission (e.g., the PSSCH 1012 of FIG. 10). The feedback message 1116 may comprise a NACK when the sidelink receiving UE 1104 is unable to decode the SCI. In such examples, the feedback message 1116 may indicate that the sidelink receiving UE 1104 received the sidelink activation indication 1114 (e.g., the SCI 1010), regardless of whether the sidelink receiving UE 1104 successfully decoded the data transmission. Thus, the sidelink receiving UE 1104 may activate the secondary resource pool (e.g., at 1120) regardless of whether the feedback message 1116 comprises an ACK or a NACK.

It may be appreciated that when the feedback message 1116 indicates that the sidelink receiving UE 1104 did not receive the sidelink activation indication 1114 or did not successfully decode the SCI, the sidelink transmitting UE 1106 may operate as if the secondary resource pool remains deactivated. For example, the sidelink transmitting UE 1106 may transmit the sidelink packet 1122 to the sidelink receiving UE 1104 on the resources of the primary resource pool and not on the resources of the secondary resource pool.

At 1130, the sidelink receiving UE 1104 deactivates the secondary resource pool. Deactivating the secondary resource pool may provide power savings by reducing the bandwidth that the sidelink receiving UE 1104 monitors for sidelink communication. That is, the sidelink receiving UE 1104 monitors for sidelink communications on the resources associated with active resource pools. Thus, when a resource pools is deactivated (e.g., at 1130), the sidelink receiving UE 1104 stops monitoring the resources associated with the deactivated resource pool for sidelink communication.

The sidelink receiving UE 1104 may deactivate the secondary resource pool based on an occurrence of a deactivating event. For example, at 1132, the sidelink receiving UE 1104 may detect an occurrence of a deactivating event. In some examples, the occurrence of a deactivating event may include receiving a deactivation indication. In a first aspect, the sidelink receiving UE 1104 may receive a deactivation indication from the base station 1102. For example, the base station 1102 may receive information indicating a decrease in sidelink communication and, thus, may facilitate deactivating an active secondary resource pool for sidelink communication. The base station 1102 may transmit a downlink deactivation indication 1134 that is received by the sidelink receiving UE 1104. The base station 1102 may transmit the downlink deactivation indication 1134 on a frequency resource of a downlink channel, such as a downlink control channel (e.g., a PDCCH) and/or a downlink data channel (e.g., a PDSCH). In some examples, the base station 1102 may transmit the downlink deactivation indication 1134 on a resource of the primary resource pool. The downlink deactivation indication 1134 may comprise layer 1 signaling and/or layer 2 signaling. For example, the downlink activation indication 1112 may comprise DCI (e.g., DCI format 3_x), a downlink wake-up signal, a downlink MAC-CE, and/or downlink RRC signaling.

In a second aspect, the sidelink receiving UE 1104 may receive the deactivation indication from the sidelink transmitting UE 1106. For example, the sidelink transmitting UE 1106 may determine a decrease in sidelink communication and, thus, may facilitate deactivating an active secondary resource pool for sidelink communication. The sidelink transmitting UE 1106 may transmit a sidelink deactivation indication 1136 that is received by the sidelink receiving UE 1104. The sidelink transmitting UE 1106 may transmit the sidelink deactivation indication 1136 on a resource of an active resource pool. For example, and referring to the example of FIG. 10, for the first interval 1030 and/or the third interval 1034, the sidelink transmitting UE 1106 may transmit the sidelink deactivation indication 1136 on a resource of the primary resource pool 1002. For the second interval 1032, the sidelink transmitting UE 1106 may transmit the sidelink deactivation indication 1136 on a resource of the primary resource pool 1002 and/or a resource of the secondary resource pool 1004. The sidelink deactivation indication 1136 may comprise layer 1 signaling and/or layer 2 signaling. For example, the sidelink deactivation indication 1136 may comprise SCI, a sidelink wake-up signal, a sidelink MAC-CE, and/or sidelink RRC signaling.

In some examples, the sidelink transmitting UE 1106 may transmit the sidelink deactivation indication 1136 to the sidelink receiving UE 1104 based on a deactivation indication received by the base station 1102. For example, the base station 1102 may transmit a deactivation indication 1138 that is received by the sidelink transmitting UE 1106. The deactivation indication 1138 may indicate a decrease in sidelink communication and the sidelink transmitting UE 1106 may transmit the sidelink deactivation indication 1136 to the sidelink receiving UE 1104 based on the deactivation indication 1138.

In some examples, the deactivation event may be based on a timer. For example, after the sidelink receiving UE 1104 activates the secondary resource pool (e.g., at 1120), the sidelink receiving UE 1104 may initiate a timer (e.g., at 1140). The timer may correspond to a period (e.g., a deactivation period) for which the sidelink receiving UE 1104 monitors for sidelink communication. When the sidelink receiving UE 1104 receives sidelink communication that satisfies a threshold amount of traffic, the sidelink receiving UE 1104 may reset the timer. For example, at 1142, the sidelink receiving UE 1104 may reset the timer based on receipt of the sidelink packet 1122. It may be appreciated that the threshold amount of traffic may correspond to receiving any traffic or an amount of traffic greater than zero.

At 1144, the sidelink receiving UE 1104 detects the occurrence of the deactivating event (e.g., at 1132) when the timer expires. For example, the sidelink receiving UE 1104 may not receive the threshold amount of traffic while the timer is active (e.g., for the duration of the deactivation period).

It may be appreciated that when the sidelink receiving UE 1104 activates the secondary resource pool (e.g., at 1120), the sidelink receiving UE 1104 starts monitoring for sidelink communication on the resources associated with the secondary resource pool. However, the sidelink transmitting UE 1106 may not monitor for sidelink communication on the resources associated with the secondary resource pool. Thus, to facilitate bi-directional sidelink communication on the resources of the secondary resource pool, the sidelink receiving UE 1104 may perform the procedure for activating the secondary resource pool at the sidelink transmitting UE 1106. For example, the sidelink receiving UE 1104 may transmit an activation indication to the sidelink transmitting UE 1106 to cause the sidelink transmitting UE 1106 to activate the secondary resource pool. In this manner, the sidelink transmitting UE 1106 and the sidelink receiving UE 1104 may transmit and/or receive sidelink communication on the resources of the secondary resource pool. In some examples, when the sidelink transmitting UE 1106 transmits the sidelink activation indication 1114 to the sidelink receiving UE 1104, each of the sidelink UEs 1104, 1106 may start monitoring for sidelink communication from the other sidelink UE on the resources associated with the primary resource pool and the activated secondary sidelink pool.

Figure 12:
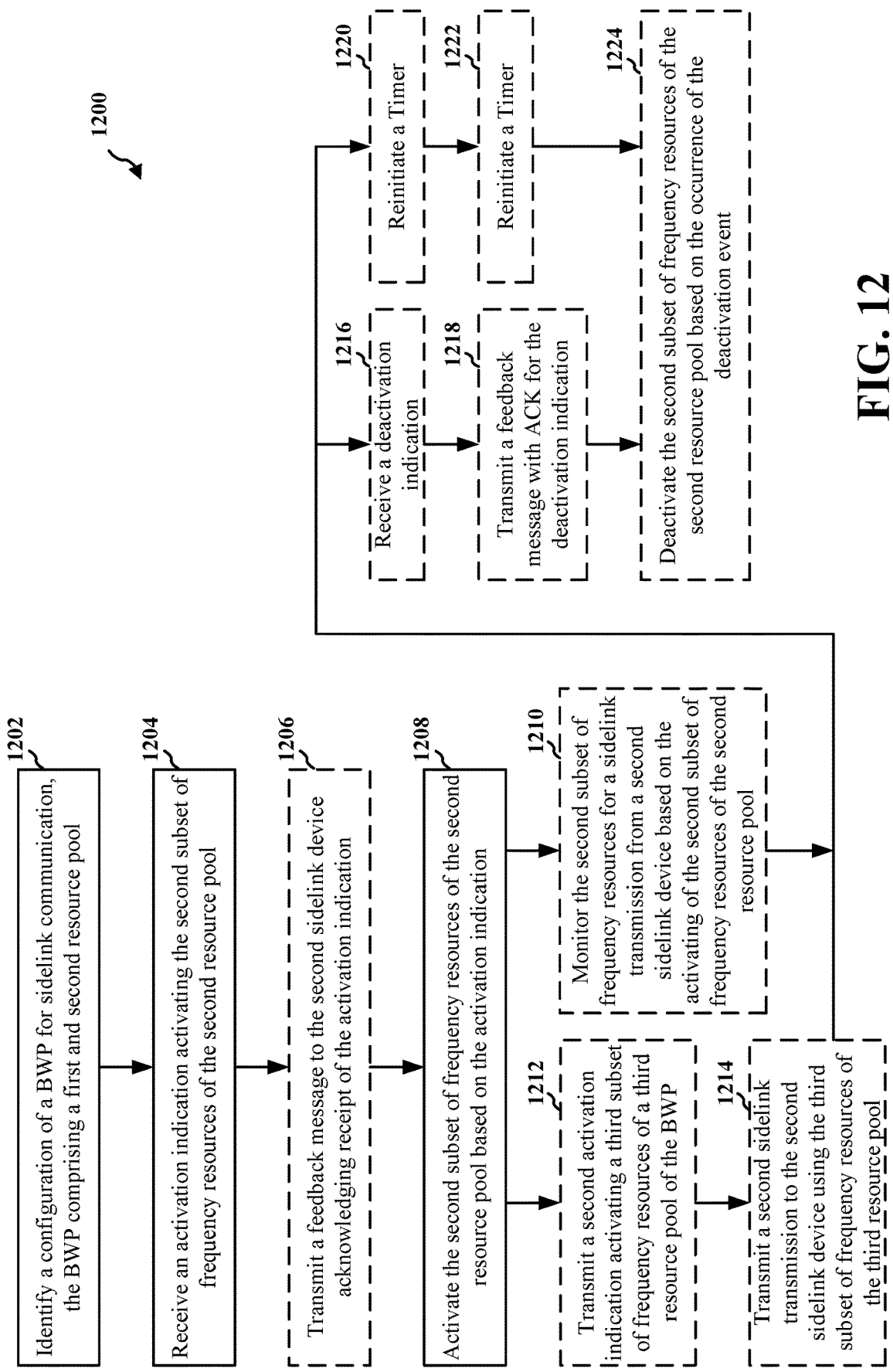
FIG. 12 is a flowchart of a method of wireless communication at a first sidelink device, in accordance with the teachings disclosed herein.

FIG. 12 is a flowchart 1200 of a method of wireless communication. The method may be performed by a sidelink device such as a UE (e.g., the UE 104; the apparatus 1302). Optional aspects are illustrated with a dashed line. The method may enable a sidelink device to more efficiently use frequency resources and to improve battery use of sidelink devices.

At 1202, the first sidelink device identifies a configuration of a BWP for sidelink communication. The BWP may include aspects described in connection with FIG. 9. The BWP may include at least a first resource pool including a first subset of frequency resources and a second resource pool including a second subset of frequency resources. The first resource pool may include a primary resource pool, and the second resource pool may include a secondary resource pool. For example, the first resource pool may include a primary resource pool with the first subset of frequency resources that are activated, and the second resource pool may include a secondary resource pool with the second subset of frequency resources that are capable of being activated and deactivated, such as described in connection with FIG. 9. The identification of the BWP may be performed by the BWP component 1340 of the apparatus 1302 in FIG. 13. In some aspects, the first sidelink device may receive the configuration of the BWP, e.g., in a wireless message from another wireless device. In other aspects, the first sidelink device may identify the BWP without receiving a configuration in a wireless message. In some aspects, the first sidelink device may identify a single BWP for the sidelink communication.

At 1204, the first sidelink device receives an activation indication activating the second subset of frequency resources of the second resource pool. The reception of the activation indication may be performed, e.g., by the indication component 1342 via the reception component 1330 of the apparatus 1302 in FIG. 13. In some aspects, the first sidelink device may receive the activation indication in the first subset of frequency resources of the first resource pool, e.g., and may not receive the activation indication in the second subset of frequency resources of the second resource pool. The BWP may include multiple secondary resource pools including respective subsets of frequency resources that are capable of being activated and deactivated, and the activation indication may activate and/or deactivate frequency resources of at least one of the multiple secondary resource pools.

The first sidelink device may receive the activation indication from another sidelink device. The other sidelink device may be another UE. The first sidelink device may receive the activation indication from the second sidelink device via sidelink. In some aspects, the first sidelink device may receive the activation indication in L1 or L2 signaling from the sidelink device. The activation indication may comprise, or may be comprised in, at least one of sidelink control information, a sidelink wake-up signal, a sidelink MAC-CE, or sidelink RRC signaling. The sidelink activation may be from a transmitting UE, which may have been triggered by L1 or L2 signaling from a base station, such as described in connection with FIG. 11. The activation may be received in SCI. The SCI may schedule sidelink resources in the primary resource pool and/or the secondary resource pool. In some aspects, if the activation command is received in SCI, the SCI may schedule a sidelink transmission using resources in the primary (i.e., first) resource pool and not in the secondary (i.e., second) resource pool.

In some aspects, the first sidelink device may receive the activation indication from a base station via an access link. In some aspects, the first sidelink device may receive the activation indication in L1 or L2 signaling from the base station. The activation indication may comprise, or be comprised in, at least one of downlink control information, a downlink wake-up signal, a downlink MAC-CE, or downlink radio resource control signaling. In some aspects, DCI may schedule a sidelink grant in the new resource pool, e.g., the active second resource pool. The base station may use DCI format 3_x (e.g., 3_0 or 3_1) to indicate the activation of the second resource pool (e.g., for a sidelink transmitting UE) and may schedule a SL grant indicating a set of frequency resources in the second resource pool for the transmitting UE to transmit one or more sidelink packet to a sidelink receiving UE.

At 1208, the first sidelink device activates the second subset of frequency resources of the second resource pool based on the activation indication. The activation may be performed, e.g., by the resource activation component 1346 of the apparatus 1302 in FIG. 13.

In some aspects, as illustrated at 1206, the first sidelink device may transmit a feedback message to the second sidelink device acknowledging receipt of the activation indication. The first sidelink device may activate the second subset of frequency resources of the second resource pool, at 1308, after transmitting the feedback message. The transmission of the feedback may be performed, e.g., by the feedback component 1344 via the transmission component 1334 of the apparatus 1302 in FIG. 13. The first sidelink device may transmit the feedback message using the first subset of frequency resources of the first resource pool. The activation indication may comprise SCI that does not schedule a data transmission (e.g., that foregoes scheduling a data transmission. The first wireless device may transmit the feedback message, at 1206, to the second sidelink device after decoding the SCI, the feedback message acknowledging receipt of the activation indication. In other aspects, the activation indication may comprise SCI scheduling a data transmission, and the first wireless device may transmit the feedback message, at 1206, to the second sidelink device after attempting to decode the data transmission. The feedback message may acknowledge receipt of the activation indication and a decoding status of the data transmission.

In some aspects, as illustrated at 1210, the first sidelink device may monitor the second subset of frequency resources for a sidelink transmission from a second sidelink device based on the activating of the second subset of frequency resources of the second resource pool. The monitoring may be performed, e.g., by the monitor component 1348 of the apparatus 1302 in FIG. 13. For example, the first sidelink device may monitor for the sidelink transmission in one or more active resource pools of the BWP and may forego monitoring (e.g., may skip monitoring or may not monitor) for the sidelink transmission in frequency resources outside the one or more active resources pools of the BWP.

In some aspects, as illustrated at 1212, the first sidelink device may transmit a second activation indication to the second sidelink device, the second activation indication activating a third subset of frequency resources of a third resource pool of the BWP. The third subset of frequency resources may be capable of being activated and deactivated, e.g., similar to the second subset of frequency resources. The second resource pool may be the same as the third resource pool, in some aspects. In other aspects, the second resource pool may be different than the third resource pool. The transmission of the second activation indication may be performed, e.g., by the indication component 1342 via the transmission component 1334 of the apparatus 1302 in FIG. 13.

As illustrated at 1214, the first sidelink device may transmit a second sidelink transmission to the second sidelink device using the third subset of frequency resources of the third resource pool. The transmission may be performed, e.g., by the sidelink communication component 1350 via the transmission component 1334 of the apparatus 1302.

In some aspects, as illustrated at 1224, the first sidelink device may deactivate the second subset of frequency resources of the second resource pool based on an occurrence of a deactivation event. The deactivation, and/or the detection of the occurrence of the deactivation event, may be performed, e.g., by the deactivation component 1354 of the apparatus 1302 in FIG. 13.

In some aspects, as illustrated at 1216, the first sidelink device may receive a deactivation indication. The occurrence of the deactivation event, which triggers the deactivation at 1224, may be based on the first sidelink device receiving the deactivation indication. The reception of the deactivation indication may be performed by the indication component 1342 via the reception component 1330 of the apparatus 1302 in FIG. 13. The first sidelink device may receive the deactivation indication from the second sidelink device, and the deactivation indication may comprise, or be comprised in, at least one of sidelink control information, a wake-up signal, a sidelink MAC-CE, or sidelink radio resource control signaling. The first sidelink device may receive the deactivation indication from a base station, and the deactivation indication may comprise, or be comprised in, at least one of downlink control information, a downlink wake-up signal, a downlink MAC-CE, or downlink radio resource control signaling. The first sidelink device may receive the deactivation indication in the first subset of frequency resources of the first resource pool or the second subset of frequency resource of the second resource pool.

In some aspects, as illustrated at 1218, the first sidelink device may transmit a feedback message to the second sidelink device acknowledging receipt of the deactivation indication. The first sidelink device may deactivate the second subset of frequency resources of the second resource pool, at 1224, after transmitting the feedback message. The transmission of the feedback may be performed, e.g., by the feedback component 1344 via the transmission component 1334 of the apparatus 1302 in FIG. 13. The first sidelink device may transmit the feedback message using the first subset of frequency resources of the first resource pool or the second subset of frequency resources of the second resource pool.

In some aspects, as illustrated at 1220, the first sidelink device may initiate a timer after receiving the sidelink transmission in the second subset of frequency resources of the second resource pool. The occurrence of the deactivation event, which triggers the deactivation at 1324, may be based on an expiration of the timer. As illustrated at 1222, the first sidelink device may re-initiate the timer when a transmission is received in the second subset of frequency resources of the second resource pool. The initiation and/or re-initiation of the timer may be performed by the timer component 1352 of the apparatus 1302 in FIG. 13.

Figure 13:
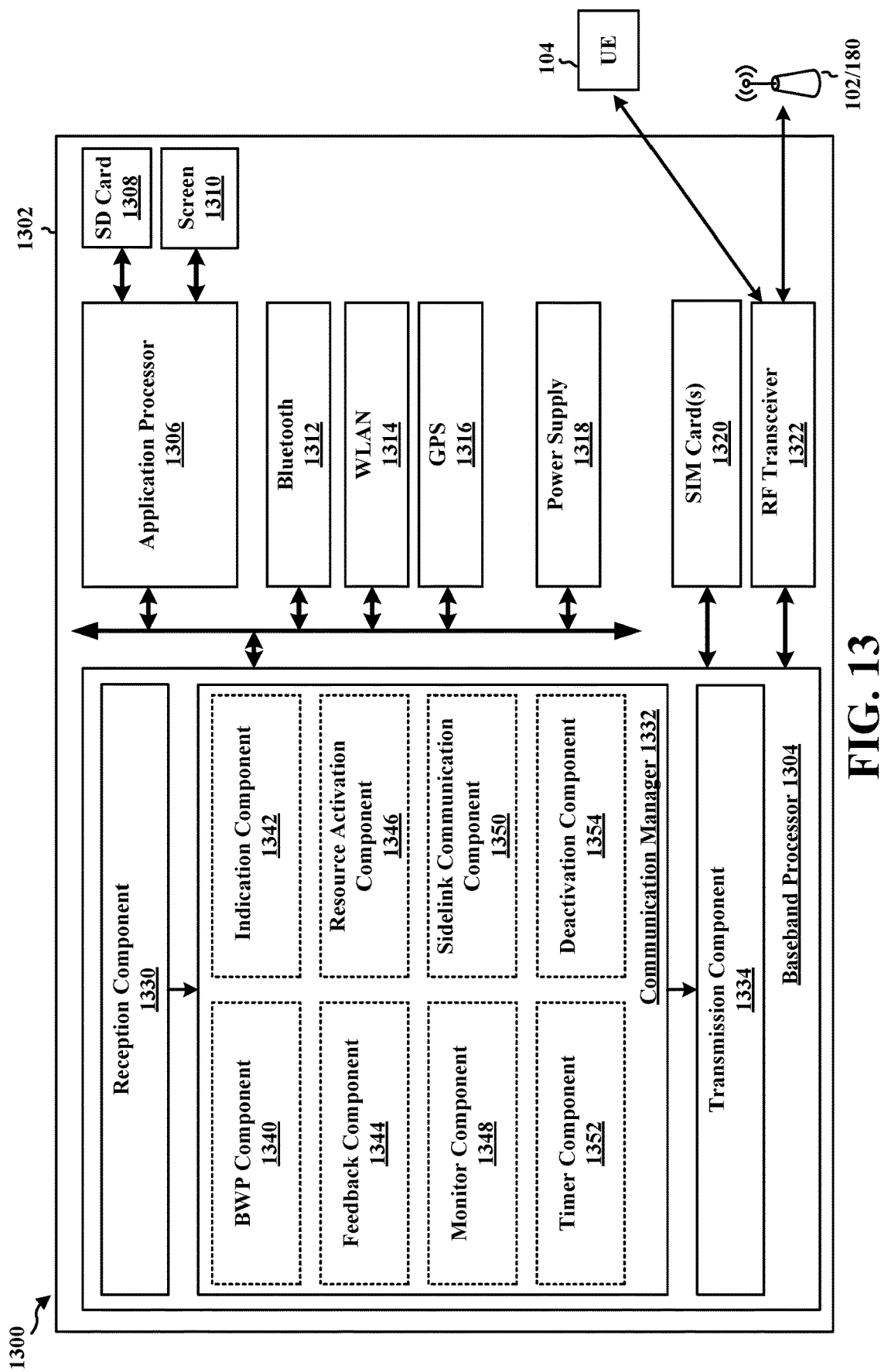
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 is a sidelink device, such as a UE, and includes a baseband processor 1304 (also referred to as a modem) coupled to a RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The baseband processor 1304 communicates through the RF transceiver 1322 with the UE 104 and/or BS 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described supra. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire wireless device (e.g., see 350 of FIG. 3) and include the additional modules of the apparatus 1302.

The communication manager 1332 includes a BWP component 1340 that is configured to identify a configuration of a BWP for sidelink communication, e.g., as described in connection with 1202. The communication manager 1332 further includes an indication component 1342 that is configured to receive and/or transmit an indication to activate or deactivate a subset of frequency resources of a secondary resource pool, e.g., as described in connection with any of 1204, 1212, and/or 1216 in FIG. 12. The communication manager 1332 further includes a feedback component 1344 that is configured to transmit feedback, e.g., as described in connection with 1206 and/or 1218 in FIG. 12. The communication manager 1332 further includes a resource activation component 1346 that is configured to activate the second subset of frequency resources based on the activation indication, e.g., as described in connection with 1208 in FIG. 12. The communication manager 1332 further includes a monitor component 1348 that is configured to monitor the second subset of frequency resources for a sidelink transmission from a second sidelink device based on the activating of the second resource pool, e.g., as described in connection with 1210 in FIG. 12. The communication manager 1332 further includes a sidelink communication component 1350 that is configured to transmit a second sidelink transmission to the second sidelink device using the third subset of frequency resources of the third resource pool, e.g., as described in connection with 1214 in FIG. 12. The communication manager 1332 further includes a timer component 1352 that is configured to initiate and/or re-initiate a timer, e.g., as described in connection with 1220 and/or 1222 in FIG. 12. The communication manager 1332 further includes a deactivation component 1354 that is configured to deactivate the second subset of frequency resources of the second resource pool based on the occurrence of the deactivation event, e.g., as described in connection with 1224 in FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband processor 1304, includes means for identifying a configuration of a bandwidth part (BWP) for sidelink communication, the BWP comprising at least a first resource pool including a first subset of frequency resources and a second resource pool including a second subset of frequency resources; means for receiving an activation indication activating the second subset of frequency resources of the second resource pool; and means for activating the second subset of frequency resources of the second resource pool based on the activation indication. The apparatus 1302 may further include means for monitoring the second subset of frequency resources for a sidelink transmission from a second sidelink device based on the activating of the second resource pool. The apparatus 1302 may further include means for transmitting a feedback message to the second sidelink device acknowledging receipt of the activation indication. The means for transmitting the feedback message may be configured to transmit the feedback message to the second sidelink device after decoding the SCI, the feedback message acknowledging receipt of the activation indication. The means for transmitting the feedback message may be configured to transmit feedback message to the second sidelink device after attempting to decode the data transmission, the feedback message acknowledging receipt of the activation indication and a decoding status of the data transmission. The apparatus 1302 may further include means for deactivating the second subset of frequency resources of the second resource pool based on an occurrence of a deactivation event. The apparatus 1302 may further include means for receiving a deactivation indication, wherein the occurrence of the deactivation event comprises the first sidelink device receiving the deactivation indication. The apparatus 1302 may further include means for transmitting a feedback message to the second sidelink device acknowledging receipt of the deactivation indication. The apparatus 1302 may further include means for initiating a timer after receiving the sidelink transmission in the second subset of frequency resources of the second resource pool, wherein the occurrence of the deactivation event comprises an expiration of the timer. The apparatus 1302 may further include means for re-initiating the timer when a transmission is received in the second subset of frequency resources of the second resource pool. The apparatus 1302 may further include means for transmitting a second activation indication to the second sidelink device, the second activation indication activating a third subset of frequency resources of a third resource pool of the BWP, the third subset of frequency resources capable of being activated and deactivated; and means for transmitting a second sidelink transmission to the second sidelink device using the third subset of frequency resources of the third resource pool.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
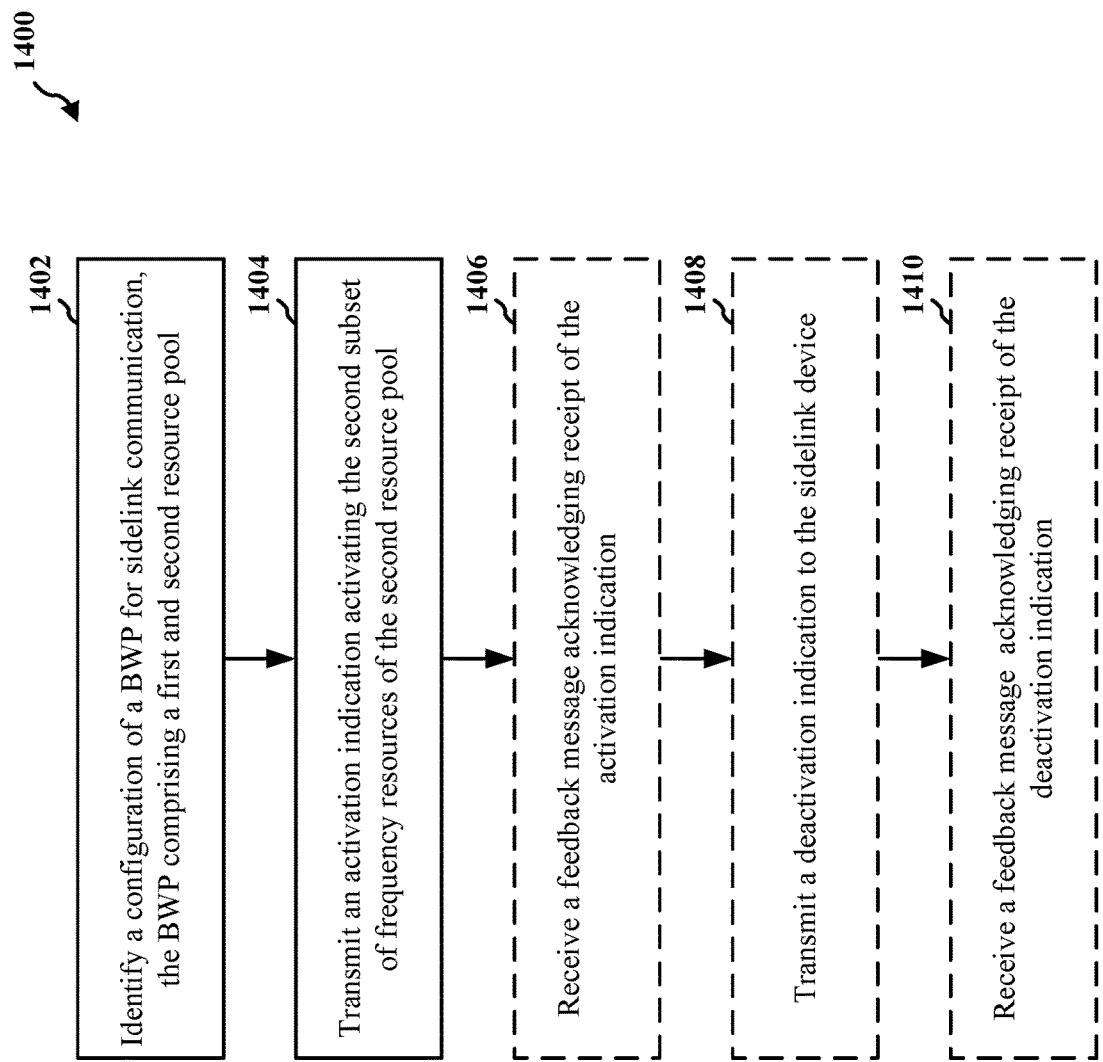
FIG. 14 is a flowchart of a method of wireless communication at a base station, in accordance with the teachings disclosed herein.

FIG. 14 is a flowchart 1400 of a method of wireless communication. The method may be performed by a base station (e.g., the base station 102, 180, the first wireless communication device 310; the apparatus 1502). Optional aspects are illustrated with a dashed line. The method may enable the base station to assist a sidelink device in more efficient use of frequency resources and reduced battery use.

At 1402, the base station identifies a configuration of a BWP for sidelink communication, the BWP comprising at least a first resource pool including a first subset of frequency resources and a second resource pool including a second subset of frequency resources. The BWP may include aspects described in connection with FIG. 9. The BWP may include at least a first resource pool including a first subset of frequency resources and a second resource pool including a second subset of frequency resources. The first resource pool may include a primary resource pool, and the second resource pool may include a secondary resource pool. For example, the first resource pool may include a primary resource pool with the first subset of frequency resources that are activated, and the second resource pool may include a secondary resource pool with the second subset of frequency resources that are capable of being activated and deactivated, such as described in connection with FIG. 9. The identification of the BWP may be performed by the sidelink BWP component 1540 of the apparatus 1502 in FIG. 15. In some aspects, the base station may transmit the configuration of the BWP, e.g., in a wireless message from a sidelink device. In other aspects, the base station may identify the BWP without transmitting a configuration in a wireless message. In some aspects, the base station may identify a single BWP for the sidelink communication.

At 1404, the base station transmits an activation indication activating the second subset of frequency resources of the secondary resource pool. The transmission of the activation indication may be performed, e.g., by the activation component 1542 via the transmission component 1534 of the apparatus 1502 in FIG. 15. The base station may transmit the activation indication to the sidelink device via an access link. The activation indication may comprise, or be comprised in, at least one of downlink control information, a downlink wake-up signal, a downlink MAC-CE, or downlink radio resource control signaling. The BWP may include multiple secondary resource pools, and the activation indication may activate, and/or deactivate, resources at least one of the second secondary resource pools.

In some aspects, as illustrated at 1406, the base station may receive a feedback message from the sidelink device acknowledging receipt of the activation indication. The reception of the feedback may be performed, e.g., by the feedback component 1546 via the reception component 1530 of the apparatus 1502 in FIG. 15. The base station may receive the feedback message using the first subset of frequency resources of the first resource pool.

In some aspects, as illustrated at 1408, the base station may transmit a deactivation indication to the sidelink device, the deactivation indication deactivating the second subset of frequency resources of the second resource pool. The transmission of the deactivation indication may be performed, e.g., by the deactivation component 1544 via the transmission component 1534 of the apparatus 1502 in FIG. 15. The base station may transmit the deactivation indication in at least one of downlink control information, a downlink wake-up signal, a downlink MAC-CE, or downlink RRC signaling. The base station may transmit the deactivation indication in the first subset of frequency resources of the first resource pool or the second subset of frequency resource of the second resource pool.

In some aspects, as illustrated at 1410, the base station may receive a feedback message acknowledging receipt of the deactivation indication. The reception of the feedback may be performed, e.g., by the feedback component 1546 via the reception component 1530 of the apparatus 1502 in FIG. 15. The base station may receive the feedback message using the first subset of frequency resources of the first resource pool or the second subset of frequency resources of the second resource pool.

Figure 15:
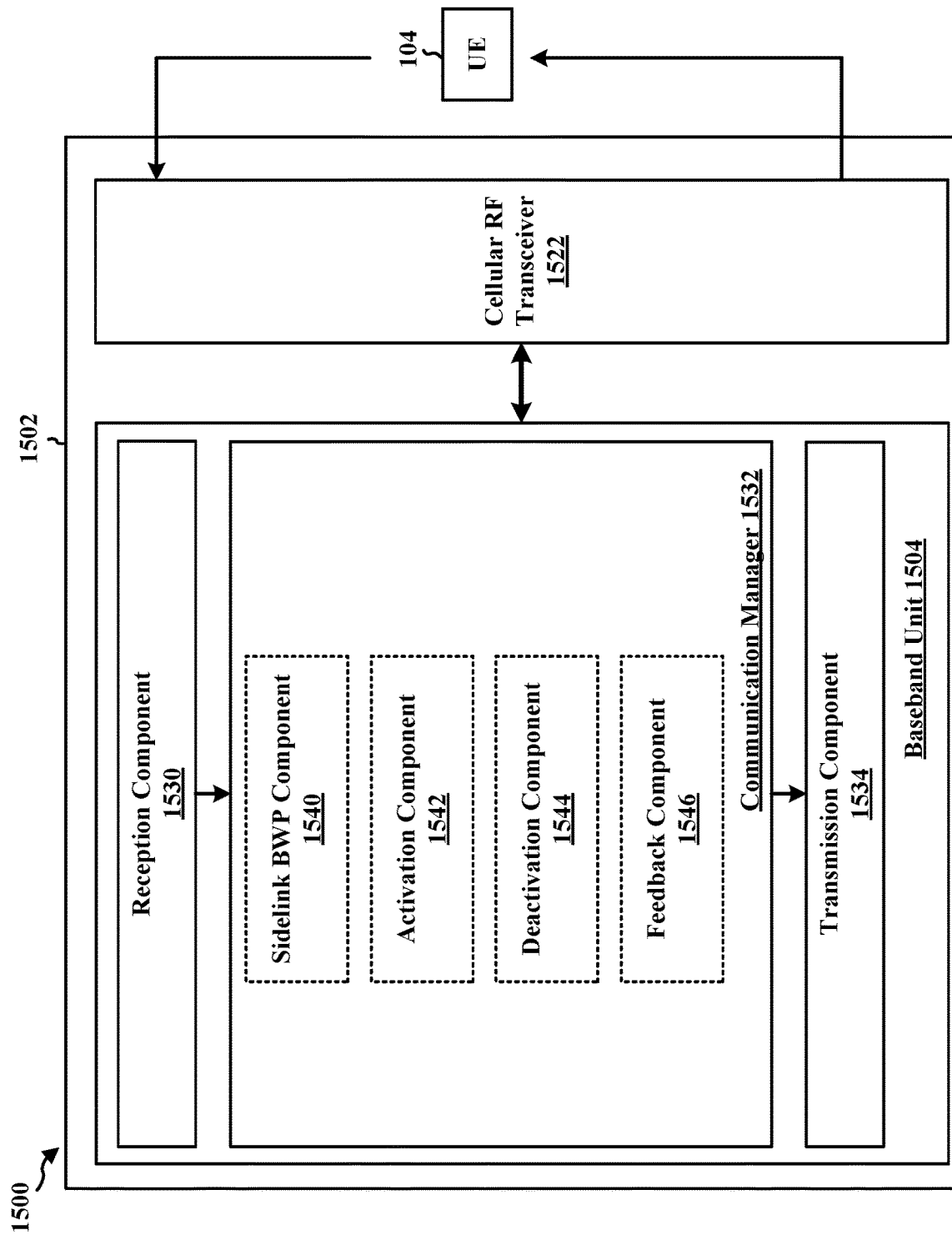
FIG. 15 is a diagram illustrating an example of a hardware implementation for an example apparatus, in accordance with the teachings disclosed herein.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the first wireless communication device 310 and may include the memory 376 and/or at least one of the TX processor 316, the RX processor 370, and the controller/processor 375.

The communication manager 1532 includes a sidelink BWP component 1540 that is configured to identify a configuration of a BWP for sidelink communication, the BWP comprising at least a first resource pool including a first subset of frequency resources and a second resource pool including a second subset of frequency resources, e.g., as described in connection with 1402 in FIG. 14. The communication manager 1532 further includes an activation component 1542 that is configured to transmit an activation indication activating the second subset of frequency resources of the secondary resource pool, e.g., as described in connection with 1404 in FIG. 14. The communication manager 1532 further includes a deactivation component 1544 that is configured to transmit a deactivation indication to the sidelink device, the deactivation indication deactivating the second subset of frequency resources of the second resource pool, e.g., as described in connection with 1408 in FIG. 14. The communication manager 1532 further includes a feedback component 1546 that is configured to receive a feedback message acknowledging receipt of the activation and/or deactivation indication, e.g., as described in connection with 1406 and/or 1410 in FIG. 14.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for identifying identifies a configuration of a BWP for sidelink communication, the BWP comprising at least a first resource pool including a first subset of frequency resources and a second resource pool including a second subset of frequency resources; and means for transmitting an activation indication activating the second subset of frequency resources of the secondary resource pool. The apparatus 1502 may further include means for receiving a feedback message from the sidelink device acknowledging receipt of the activation indication. The apparatus 1502 may further include means for a deactivation indication to the sidelink device, the deactivation indication deactivating the second subset of frequency resources of the second resource pool. The apparatus 1502 may further include means for receiving a feedback message from the sidelink device acknowledging receipt of the deactivation indication.

The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
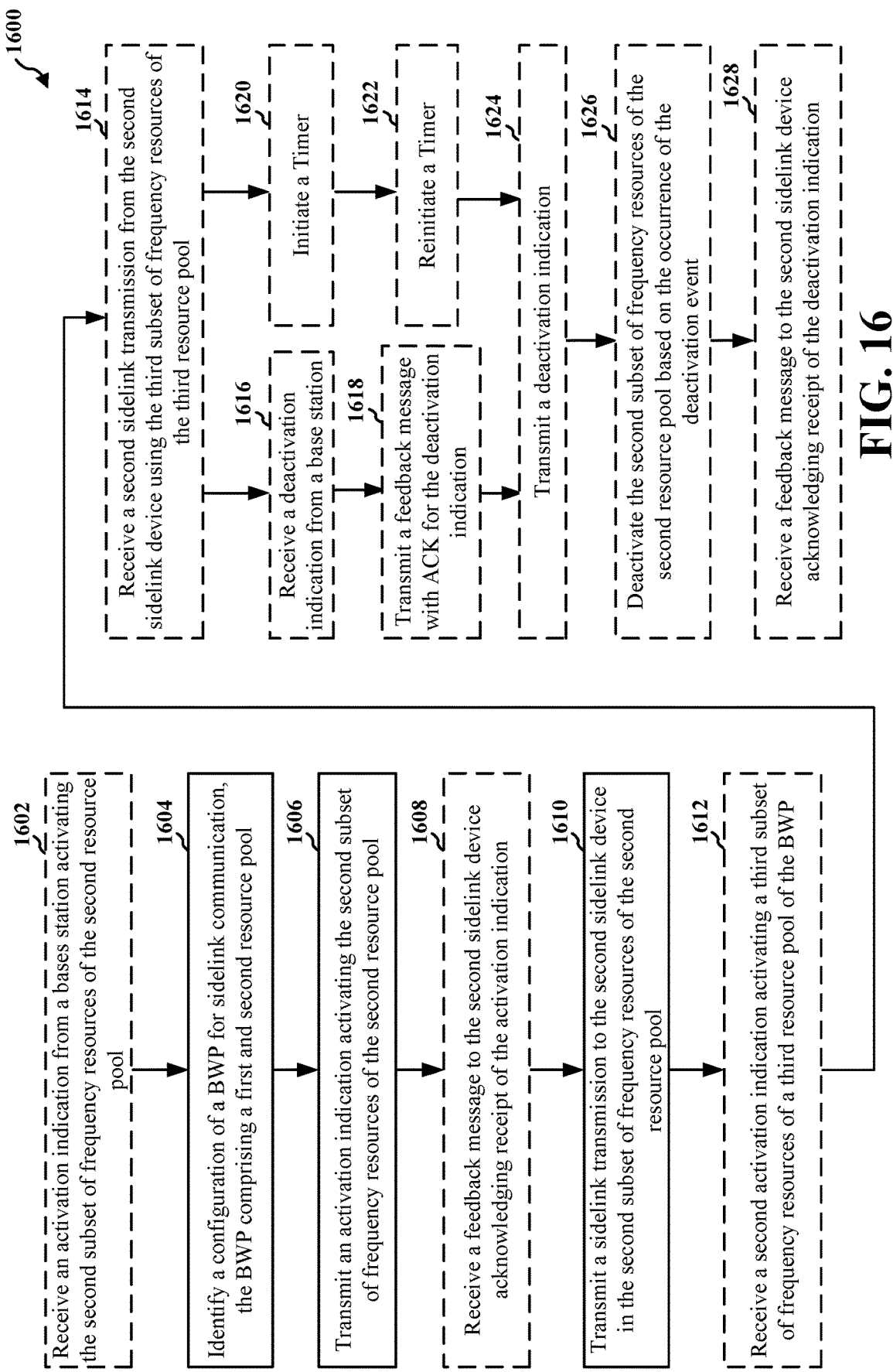
FIG. 16 is a flowchart of a method of wireless communication at a first sidelink device, in accordance with the teachings disclosed herein.

FIG. 16 is a flowchart 1600 of a method of wireless communication. The method may be performed by a sidelink device such as a UE (e.g., the UE 104; the apparatus 1302). Optional aspects are illustrated with a dashed line. The method may enable a sidelink device to more efficiently use frequency resources and to improve battery use of sidelink devices.

At 1604, the first sidelink device identifies a configuration of a BWP for sidelink communication. The BWP may include aspects described in connection with FIG. 9. The BWP may include at least a first resource pool including a first subset of frequency resources and a second resource pool including a second subset of frequency resources. The first resource pool may include a primary resource pool, and the second resource pool may include a secondary resource pool. For example, the first resource pool may include a primary resource pool with the first subset of frequency resources that are activated, and the second resource pool may include a secondary resource pool with the second subset of frequency resources that are capable of being activated and deactivated, such as described in connection with FIG. 9. The identification of the BWP may be performed by the BWP component 1740 of the apparatus 1702 in FIG. 17. In some aspects, the first sidelink device may receive the configuration of the BWP, e.g., in a wireless message from another wireless device. In other aspects, the first sidelink device may identify the BWP without receiving a configuration in a wireless message. In some aspects, the first sidelink device may identify a single BWP for the sidelink communication.

At 1606, the first sidelink device transmits an activation indication to a second sidelink device, the activation indication activating the second subset of frequency resources of the second resource pool. The reception of the activation indication may be performed, e.g., by the indication component 1742 via the reception component 1730 of the apparatus 1702 in FIG. 17. In some aspects, the first sidelink device may transmit the activation indication in the first subset of frequency resources of the first resource pool, e.g., and may not transmit the activation indication in the second subset of frequency resources of the second resource pool. The BWP may include multiple secondary resource pools including respective subsets of frequency resources that are capable of being activated and deactivated, and the activation indication may activate and/or deactivate frequency resources of at least one of the multiple secondary resource pools.

The first sidelink device may transmit the activation indication to the second sidelink device via sidelink. In some aspects, the first sidelink device may transmit the activation indication in L1 or L2 signaling to the second sidelink device. The activation indication may comprise, or may be comprised in, at least one of sidelink control information, a sidelink wake-up signal, a sidelink MAC-CE, or sidelink RRC signaling. The activation may be transmitted in SCI. The SCI may schedule sidelink resources in the primary resource pool and/or the secondary resource pool. In some aspects, if the activation command is transmitted in SCI, the SCI may schedule a sidelink transmission using resources in the primary (i.e., first) resource pool and not in the secondary (i.e., second) resource pool.

The sidelink activation may be from a transmitting UE, which may have been triggered by L1 or L2 signaling from a base station, such as described in connection with FIG. 11. As illustrated at 1602, the first sidelink device may receive a second activation indication from a base station via an access link, the second activation indication activating the second subset of frequency resources of the second resource pool, where the first sidelink device transmits the activation indication to the second sidelink device, at 1606, after receiving the second activation indication from the base station. The second activation indication may comprise, or be comprised in, at least one of downlink control information, a downlink wake-up signal, a downlink MAC-CE, or downlink RRC signaling.

In some aspects, as illustrated at 1608, the first sidelink device may receive a feedback message from the second sidelink device acknowledging receipt of the activation indication. The first sidelink device may transmit the sidelink transmission in the second subset of frequency resources of the second resource pool, at 1610, after receiving the feedback message. The reception of the feedback may be performed, e.g., by the feedback component 1744 via the reception component 1730 of the apparatus 1702 in FIG. 17. The first sidelink device may receive the feedback message using the first subset of frequency resources of the first resource pool. The first sidelink device may activate the second subset of frequency resources of the second resource pool after an interval of time after transmitting the activation indication to the second sidelink device.

The activation indication, transmitted at 1606, may comprise SCI that does not schedule (e.g., that foregoes scheduling) a data transmission, and the first sidelink device may receive the feedback message, at 1608, acknowledging receipt of the activation indication from the second sidelink device.

The activation indication, transmitted at 1606, may comprise SCI scheduling a data transmission, and the first sidelink device may receive the feedback message, at 1608, based on an attempt to decode the data transmission.

At 1610, the first sidelink device transmits a sidelink transmission to the second sidelink device in the second subset of frequency resources of the second resource pool. The transmission may be performed, e.g., by the sidelink communication component 1750 via the transmission component 1734 of the apparatus 1702 in FIG. 17. The second activation indication, received at 1602, may comprise DCI scheduling a sidelink grant in the second resource pool, and the first sidelink device may transmit the sidelink transmission, at 1610, to the second sidelink device based on the sidelink grant.

In some aspects, as illustrated at 1626, the first sidelink device may deactivate the second subset of frequency resources of the second resource pool based on an occurrence of a deactivation event. For example, as illustrated at 1624, the first sidelink device may transmit a deactivation indication to the second sidelink device based on the occurrence of the deactivation event, the deactivation indication deactivating the second subset of frequency resources of the second resource pool. The deactivation may be performed by the deactivation component 1754 of the apparatus 1702, and the transmission of the deactivation indication may be performed by the indication component 1742 via the transmission component 1734 of the apparatus 1702 in FIG. 17. The deactivation indication may comprise at least one of sidelink control information, a sidelink wake-up signal, a sidelink MAC-CE, or sidelink radio resource control signaling. The first sidelink UE may transmit the deactivation indication to the second sidelink UE in the first subset of frequency resources of the first resource pool or the second subset of frequency resources of the second resource pool.

In some aspects, as illustrated at 1628, the first sidelink device may receive a feedback message from the second sidelink device acknowledging receipt of the deactivation indication, and the first sidelink device may receive the feedback message in the first subset of frequency resources of the first resource pool or the second subset of frequency resources of the second resource pool. The reception of the feedback may be performed, e.g., by the feedback component 1744 via the reception component 1730 of the apparatus 1702 in FIG. 17.

In some aspects, as illustrated at 1616, the first sidelink device may receive a second deactivation indication from a base station, where the occurrence of the deactivation event comprises the first sidelink device receiving the second deactivation indication. The reception of the indication may be performed, e.g., by the indication component 1742 of the apparatus 1702 in FIG. 17. The second deactivation indication may comprise at least one of downlink control information, a downlink wake-up signal, a downlink MAC-CE, and downlink radio resource control signaling. The first sidelink device may transmit feedback acknowledging the deactivation indication, at 1618.

In some aspects, as illustrated at 1620, the first sidelink device may initiating a timer after transmitting the sidelink transmission in the second subset of frequency resources of the second resource pool, and the occurrence of the deactivation event may comprise an expiration of the timer. As illustrated at 1622, the first sidelink device may reinitiate the timer when a transmission is transmitted in the second subset of frequency resources of the second resource pool. The initiation and re-initiation of the timer may be performed, e.g., by the timer component 1752 of the apparatus 1702 in FIG. 17.

In some aspects, as illustrated at 1612, the first sidelink device may receive a second activation indication from the second sidelink device, the second activation indication activating a third resource pool of the BWP, the third resource pool comprising a third subset of frequency resources capable of being activated and deactivated. The reception of the indication may be performed, e.g., by the indication component 1742 of the apparatus 1702 in FIG. 17. In some examples, the third subset of frequency resources may be the same as the second subset of frequency resources and/or the third resource pool may be the same as the second resource pool. In other examples, the third subset of frequency resources may be different than the second subset of frequency resources and/or the third resource pool may be different than the second resource pool.

As illustrated at 1614, the first sidelink device may receive a second sidelink transmission from the second sidelink device using the third subset of frequency resources of the third resource pool. For example, based on the second activation indication from the second sidelink device, the first sidelink device may monitor the third subset of frequency resources. The reception of the second sidelink transmission may be performed, e.g., by the sidelink communication component 1750 via the reception component 1730 of the apparatus 1702.

Figure 17:
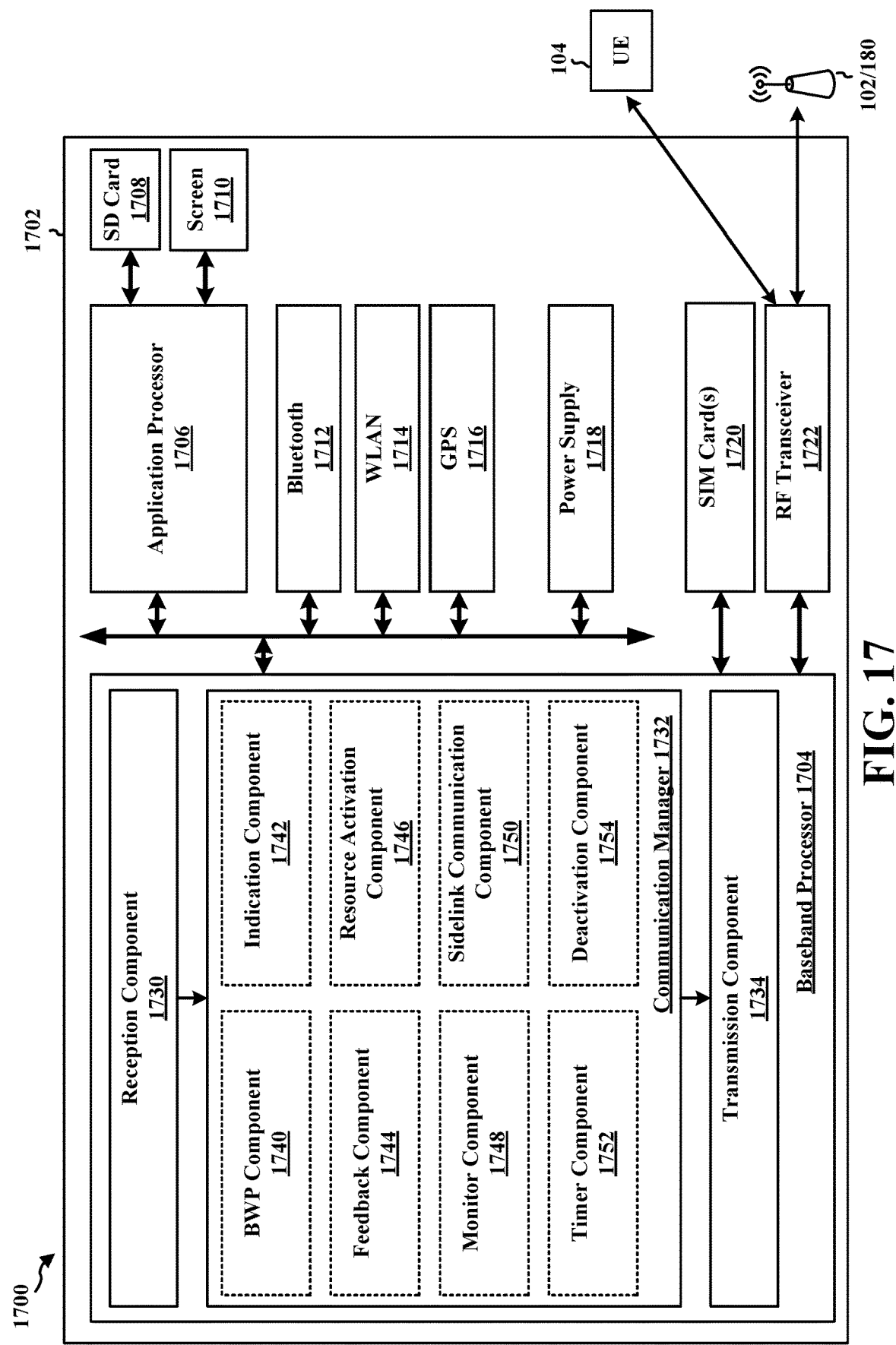
FIG. 17 is a diagram illustrating an example of a hardware implementation for an example apparatus, in accordance with the teachings disclosed herein.

FIG. 17 is a diagram 1700 illustrating an example of a hardware implementation for an apparatus 1702. The apparatus 1702 is a sidelink device, such as a UE, and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The baseband processor 1704 communicates through the RF transceiver 1722 with the UE 104 and/or BS 102/180. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described supra. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the device 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire wireless device (e.g., see 350 of FIG. 3) and include the additional modules of the apparatus 1702.

The communication manager 1732 includes a BWP component 1740 that is configured to identify a configuration of a BWP for sidelink communication, e.g., as described in connection with 1604. The communication manager 1732 further includes an indication component 1742 that is configured to receive and/or transmit an indication to activate or deactivate a subset of frequency resources of a secondary resource pool, e.g., as described in connection with any of 1602, 1606, 1612, 1616 and/or 1624 in FIG. 16. The communication manager 1732 further includes a feedback component 1744 that is configured to receive or transmit feedback, e.g., as described in connection with 1608, 1618, and/or 1628 in FIG. 16. The communication manager 1732 further includes an activation component 1746 that is configured to activate the second subset of frequency resources based on the activation indication, e.g., in response to the activation indication at 1602 and/or 1612 in FIG. 16. The communication manager 1732 further includes a monitor component 1748 that is configured to monitor the third subset of frequency resources for a sidelink transmission based on the activating of the third resource pool, e.g., as described in connection with 1610 and 1612 in FIG. 16. The communication manager 1732 further includes a sidelink communication component 1750 that is configured to transmit a sidelink transmission to the second sidelink device using the second subset of frequency resources and/or to receive the second sidelink transmission using the third subset of frequency resources of the third resource pool, e.g., as described in connection with 1610 and/or 1614 in FIG. 16. The communication manager 1732 further includes a timer component 1752 that is configured to initiate and/or re-initiate a timer, e.g., as described in connection with 1620 and/or 1622 in FIG. 16. The communication manager 1732 further includes a deactivation component 1754 that is configured to transmit a deactivation indication and/or to deactivate the second subset of frequency resources of the second resource pool based on the occurrence of the deactivation event, e.g., as described in connection with 1624 and/or 1626 in FIG. 16.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for identifying a configuration of a BWP for sidelink communication, the BWP comprising at least a first resource pool including a first subset of frequency resources and a second resource pool including a second subset of frequency resources; means for transmitting an activation indication to a second sidelink device, the activation indication activating the second subset of frequency resources of the second resource pool; and means for transmitting a sidelink transmission to the second sidelink device in the second subset of frequency resources of the second resource pool. The apparatus 1702 may further include means for receiving a feedback message from the second sidelink device after transmitting the activation indication, and where the first sidelink device transmits the sidelink transmission in the second subset of frequency resources of the second resource pool after receiving the feedback message. The apparatus 1702 may further include means for receiving a second activation indication from a base station via an access link, the second activation indication activating the second subset of frequency resources of the second resource pool, where the first sidelink device transmits the activation indication to the second sidelink device after receiving the second activation indication from the base station. The apparatus 1702 may further include means for deactivating the second subset of frequency resources of the second resource pool based on an occurrence of a deactivation event. The apparatus 1702 may further include means for transmitting a deactivation indication to the second sidelink device based on the occurrence of the deactivation event, the deactivation indication deactivating the second subset of frequency resources of the second resource pool. The apparatus 1702 may further include means for receiving a feedback message from the second sidelink device acknowledging receipt of the deactivation indication, where the first sidelink device receives the feedback message in the first subset of frequency resources of the first resource pool or the second subset of frequency resources of the second resource pool. The apparatus 1702 may further include means for receiving a second deactivation indication from a base station, wherein the occurrence of the deactivation event comprises the first sidelink device receiving the second deactivation indication. The apparatus 1702 may further include means for initiating a timer after transmitting the sidelink transmission in the second subset of frequency resources of the second resource pool, wherein the occurrence of the deactivation event comprises an expiration of the timer. The apparatus 1702 may further include means for re-initiating the timer when a transmission is transmitted in the second subset of frequency resources of the second resource pool. The apparatus 1702 may further include means for receiving a second activation indication from the second sidelink device, the second activation indication activating a third resource pool of the BWP, the third resource pool comprising a third subset of frequency resources capable of being activated and deactivated; and means for receiving a second sidelink transmission from the second sidelink device using the third subset of frequency resources of the third resource pool.

The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first sidelink device, comprising: identifying a configuration of a BWP for sidelink communication, the BWP comprising at least a first resource pool including a first subset of frequency resources and a second resource pool including a second subset of frequency resources; receiving an activation indication activating the second subset of frequency resources of the second resource pool; and activating the second subset of frequency resources of the second resource pool based on the activation indication.

Aspect 2 is the method of aspect 1, further including that the first resource pool comprises a primary resource pool including the first subset of frequency resources that are activated, and the second resource pool comprises a secondary resource pool including the second subset of frequency resources that are capable of being activated and deactivated.

Aspect 3 is the method of any of aspect 1 or aspect 2, further including: monitoring the second subset of frequency resources for a sidelink transmission from a second sidelink device based on the activating of the second subset of frequency resources of the second resource pool.

Aspect 4 is the method of any of aspects 1 to 3, further including that the first sidelink device monitors for the sidelink transmission in one or more active resource pools of the BWP and skips monitoring for the sidelink transmission in frequency resources outside active resources pools of the BWP.

Aspect 5 is the method of any of aspects 1 to 4, further including that the first sidelink device receives the activation indication in the first subset of frequency resources of the first resource pool.

Aspect 6 is the method of any of aspects 1 to 5, further including that the first sidelink device receives the activation indication from a second sidelink device via sidelink.

Aspect 7 is the method of any of aspects 1 to 6, further including that the activation indication comprises at least one of sidelink control information, a sidelink wake-up signal, a sidelink MAC-CE, or sidelink radio resource control signaling.

Aspect 8 is the method of any of aspects 1 to 7, further including: transmitting a feedback message to the second sidelink device acknowledging receipt of the activation indication, wherein the first sidelink device activates the second subset of frequency resources of the second resource pool after transmitting the feedback message.

Aspect 9 is the method of any of aspects 1 to 8, further including that the first sidelink device transmits the feedback message using the first subset of frequency resources of the first resource pool.

Aspect 10 is the method of any of aspects 1 to 9, further including that the activation indication comprises SCI and the SCI does not schedule a data transmission, the method further comprising: transmitting a feedback message to the second sidelink device after decoding the SCI, the feedback message acknowledging receipt of the activation indication.

Aspect 11 is the method of any of aspects 1 to 10, further including that the activation indication comprises SCI scheduling a data transmission, the method further comprising: transmitting a feedback message to the second sidelink device after attempting to decode the data transmission, the feedback message acknowledging receipt of the activation indication and a decoding status of the data transmission.

Aspect 12 is the method of any of aspects 1 to 11, further including that the first sidelink device receives the activation indication from a base station via an access link.

Aspect 13 is the method of any of aspects 1 to 12, further including that the activation indication comprises at least one of downlink control information, a downlink wake-up signal, a downlink MAC-CE, or downlink radio resource control signaling.

Aspect 14 is the method of any of aspects 1 to 13, further including: deactivating the second subset of frequency resources of the second resource pool based on an occurrence of a deactivation event.

Aspect 15 is the method of any of aspects 1 to 14, further including: receiving a deactivation indication, wherein the occurrence of the deactivation event comprises the first sidelink device receiving the deactivation indication.

Aspect 16 is the method of any of aspects 1 to 15, further including that the first sidelink device receives the deactivation indication from a second sidelink device, and wherein the deactivation indication comprises at least one of sidelink control information, a wake-up signal, a sidelink MAC-CE, and sidelink radio resource control signaling.

Aspect 17 is the method of any of aspects 1 to 16, further including that the first sidelink device receives the deactivation indication from a base station, and wherein the deactivation indication comprises at least one of downlink control information, a downlink wake-up signal, a downlink MAC-CE, or downlink radio resource control signaling.

Aspect 18 is the method of any of aspects 1 to 17, further including that the first sidelink device receives the deactivation indication in the first subset of frequency resources of the first resource pool or the second subset of frequency resource of the second resource pool.

Aspect 19 is the method of any of aspects 1 to 18, further including: transmitting a feedback message to a second sidelink device acknowledging receipt of the deactivation indication, wherein the first sidelink device deactivates the second subset of frequency resources of the second resource pool after transmitting the feedback message.

Aspect 20 is the method of any of aspects 1 to 19, further including that the first sidelink device transmits the feedback message using the first subset of frequency resources of the first resource pool or the second subset of frequency resources of the second resource pool.

Aspect 21 is the method of any of aspects 1 to 20, further including: initiating a timer after receiving a sidelink transmission in the second subset of frequency resources of the second resource pool, wherein the occurrence of the deactivation event comprises an expiration of the timer.

Aspect 22 is the method of any of aspects 1 to 21, further including: re-initiating the timer when a transmission is received in the second subset of frequency resources of the second resource pool.

Aspect 23 is the method of any of aspects 1 to 22, further including that the BWP comprises multiple secondary resource pools including respective subsets of frequency resources that are capable of being activated and deactivated, and the activation indication activates or deactivates frequency resources of at least one of the multiple secondary resource pools.

Aspect 24 is the method of any of aspects 1 to 23, further including: transmitting a second activation indication to a second sidelink device, the second activation indication activating a third subset of frequency resources of a third resource pool of the BWP, the third subset of frequency resources capable of being activated and deactivated; and transmitting a second sidelink transmission to the second sidelink device using the third subset of frequency resources of the third resource pool.

Aspect 25 is an apparatus for wireless communication including at least one processor coupled to a memory and configured to implement a method as in any of aspects 1 to 24.

Aspect 26 is an apparatus for wireless communication including means for implementing a method as in any of aspects 1 to 24.

Aspect 27 is a computer-readable medium storing computer executable code, where the code, when executed, causes a processor to implement a method as in any of aspects 1 to 24.

Aspect 28 is a method of wireless communication of a first sidelink device, comprising: identifying a configuration of a BWP for sidelink communication, the BWP comprising at least a first resource pool including a first subset of frequency resources and a second resource pool including a second subset of frequency resources; transmitting an activation indication to a second sidelink device, the activation indication activating the second subset of frequency resources of the second resource pool; and transmitting a sidelink transmission to the second sidelink device in the second subset of frequency resources of the second resource pool.

Aspect 29 is the method of aspect 28, further including that the first resource pool comprises a primary resource pool including the first subset of frequency resources that are activated, and the second resource pool comprises a secondary resource pool including the second subset of frequency resources that are capable of being activated and deactivated.

Aspect 30 is the method of any of aspect 28 or aspect 29, further including that the first sidelink device transmits the activation indication in the first subset of frequency resources of the first resource pool.

Aspect 31 is the method of any of aspects 28 to 30, further including that the activation indication comprises at least one of sidelink control information, a sidelink wake-up signal, a sidelink MAC-CE, or sidelink radio resource control signaling.

Aspect 32 is the method of any of aspects 28 to 31, further including: receiving a feedback message from the second sidelink device after transmitting the activation indication, and wherein the first sidelink device transmits the sidelink transmission in the second subset of frequency resources of the second resource pool after receiving the feedback message.

Aspect 33 is the method of any of aspects 28 to 32, further including that the first sidelink device activates the second subset of frequency resources of the second resource pool after an interval of time after transmitting the activation indication to the second sidelink device.

Aspect 34 is the method of any of aspects 28 to 33, further including that the first sidelink device receives the feedback message in the first subset of frequency resources of the first resource pool.

Aspect 35 is the method of any of aspects 28 to 34, further including that the activation indication comprises SCI and the SCI does not schedule a data transmission, and the first sidelink device receives the feedback message acknowledging receipt of the activation indication from the second sidelink device.

Aspect 36 is the method of any of aspects 28 to 35, further including that the activation indication comprises SCI scheduling a data transmission, and the first sidelink device receives the feedback message based on an attempt to decode the data transmission.

Aspect 37 is the method of any of aspects 28 to 36, further including: receiving a second activation indication from a base station via an access link, the second activation indication activating the second subset of frequency resources of the second resource pool, wherein the first sidelink device transmits the activation indication to the second sidelink device after receiving the second activation indication from the base station.

Aspect 38 is the method of any of aspects 28 to 37, further including that the second activation indication comprises at least one of downlink control information, a downlink wake-up signal, a downlink MAC-CE, or downlink radio resource control signaling.

Aspect 39 is the method of any of aspects 28 to 38, further including that the second activation indication comprises downlink control information scheduling a sidelink grant in the second resource pool, and wherein the first sidelink device transmits the sidelink transmission to the second sidelink device based on the sidelink grant.

Aspect 40 is the method of any of aspects 28 to 39, further including: deactivating the second subset of frequency resources of the second resource pool based on an occurrence of a deactivation event.

Aspect 41 is the method of any of aspects 28 to 40, further including: transmitting a deactivation indication to the second sidelink device based on the occurrence of the deactivation event, the deactivation indication deactivating the second subset of frequency resources of the second resource pool.

Aspect 42 is the method of any of aspects 28 to 41, further including that the deactivation indication comprises at least one of sidelink control information, a sidelink wake-up signal, a sidelink MAC-CE, or sidelink radio resource control signaling.

Aspect 43 is the method of any of aspects 28 to 42, further including that the first sidelink UE transmits the deactivation indication to the second sidelink UE in the first subset of frequency resources of the first resource pool or the second subset of frequency resources of the second resource pool.

Aspect 44 is the method of any of aspects 28 to 43, further including: receiving a feedback message from the second sidelink device acknowledging receipt of the deactivation indication, and wherein the first sidelink device receives the feedback message in the first subset of frequency resources of the first resource pool or the second subset of frequency resources of the second resource pool.

Aspect 45 is the method of any of aspects 28 to 44, further including: receiving a second deactivation indication from a base station, wherein the occurrence of the deactivation event comprises the first sidelink device receiving the second deactivation indication.

Aspect 46 is the method of any of aspects 28 to 45, further including that the second deactivation indication comprises at least one of downlink control information, a downlink wake-up signal, a downlink MAC-CE, or downlink radio resource control signaling.

Aspect 47 is the method of any of aspects 28 to 46, further including: initiating a timer after transmitting the sidelink transmission in the second subset of frequency resources of the second resource pool, wherein the occurrence of the deactivation event comprises an expiration of the timer.

Aspect 48 is the method of any of aspects 28 to 47, further including: re-initiating the timer when a transmission is transmitted in the second subset of frequency resources of the second resource pool.

Aspect 49 is the method of any of aspects 28 to 48, further including that the BWP comprises multiple secondary resource pools including respective subsets of frequency resources that are capable of being activated and deactivated, and the activation indication activates or deactivates frequency resources at least one of the multiple secondary resource pools.

Aspect 50 is the method of any of aspects 28 to 49, further including: receiving a second activation indication from the second sidelink device, the second activation indication activating a third resource pool of the BWP, the third resource pool comprising a third subset of frequency resources capable of being activated and deactivated; and receiving a second sidelink transmission from the second sidelink device using the third subset of frequency resources of the third resource pool.

Aspect 51 is an apparatus for wireless communication including at least one processor coupled to a memory and configured to implement a method as in any of aspects 28 to 50.

Aspect 52 is an apparatus for wireless communication including means for implementing a method as in any of aspects 28 to 50.

Aspect 53 is a computer-readable medium storing computer executable code, where the code, when executed, causes a processor to implement a method as in any of aspects 28 to 50.

Aspect 54 is a method of wireless communication of a base station, comprising: identifying a configuration of a BWP for sidelink communication, the BWP comprising at least a first resource pool including a first subset of frequency resources and a second resource pool including a second subset of frequency resources; and transmitting an activation indication to a sidelink UE, the activation indication activating the second subset of frequency resources of the second resource pool.

Aspect 55 is the method of aspect 54, further including that the first resource pool comprises a primary resource pool including the first subset of frequency resources that are activated, and the second resource pool comprises a secondary resource pool including the second subset of frequency resources that are capable of being activated and deactivated.

Aspect 56 is the method of any of aspect 54 or aspect 55, further including that the base station transmits the activation indication to a sidelink device via an access link.

Aspect 57 is the method of any of aspects 54 to 56, further including that the activation indication comprises at least one of downlink control information, a downlink wake-up signal, a downlink MAC-CE, or downlink radio resource control signaling.

Aspect 58 is the method of any of aspects 54 to 57, further including: transmitting a deactivation indication to a sidelink device, the deactivation indication deactivating the second subset of frequency resources of the second resource pool.

Aspect 59 is the method of any of aspects 54 to 58, further including that the base station transmits the deactivation indication in at least one of downlink control information, a downlink wake-up signal, a MAC-CE, and downlink radio resource control signaling.

Aspect 60 is the method of any of aspects 54 to 59, further including that the base station transmits the deactivation indication in the first subset of frequency resources of the first resource pool or the second subset of frequency resource of the second resource pool.

Aspect 61 is the method of any of aspects 54 to 60, further including: receiving a feedback message acknowledging receipt of the deactivation indication.

Aspect 62 is the method of any of aspects 54 to 61, further including that the base station receives the feedback message using the first subset of frequency resources of the first resource pool or the second subset of frequency resources of the second resource pool.

Aspect 63 is the method of any of aspects 54 to 62, further including that the BWP comprises multiple secondary resource pools including respective subsets of frequency resources that are capable of being activated and deactivated, and the activation indication activates or deactivates frequency resources at least one of the multiple secondary resource pools.

Aspect 64 is an apparatus for wireless communication including at least one processor coupled to a memory and configured to implement a method as in any of aspects 54 to 63.

Aspect 65 is an apparatus for wireless communication including means for implementing a method as in any of aspects 54 to 63.

Aspect 66 is a computer-readable medium storing computer executable code, where the code, when executed, causes a processor to implement a method as in any of aspects 54 to 63.

What is claimed is:

1. A method of wireless communication of a first sidelink device, comprising:
identifying a configuration of a bandwidth part (BWP) for sidelink communication, the BWP comprising at least a first resource pool including a first subset of frequency resources and a second resource pool including a second subset of the frequency resources;
transmitting an activation indication to a second sidelink device, the activation indication activating the second subset of the frequency resources of the second resource pool;
transmitting a sidelink transmission to the second sidelink device in the second subset of the frequency resources of the second resource pool;
initiating a timer after transmitting the sidelink transmission in the second subset of the frequency resources of the second resource pool; and
deactivating the second subset of the frequency resources of the second resource pool based on an expiration of the timer without sidelink traffic in the second resource pool.

2. The method of claim 1, wherein
the first resource pool comprises a primary resource pool including the first subset of the frequency resources that are activated, and
the second resource pool comprises a secondary resource pool including the second subset of the frequency resources that are configured to be activated and deactivated.

3. The method of claim 1, wherein the first sidelink device transmits the activation indication in the first subset of the frequency resources of the first resource pool.

4. The method of claim 1, wherein the activation indication comprises at least one of sidelink control information, a sidelink wake-up signal, a sidelink medium access control (MAC) control element (MAC-CE), or sidelink radio resource control signaling.

5. The method of claim 1, further comprising:
receiving a feedback message from the second sidelink device after transmitting the activation indication, and
wherein the first sidelink device transmits the sidelink transmission in the second subset of the frequency resources of the second resource pool after receiving the feedback message.

6. The method of claim 1, further comprising:
receiving a second activation indication from a base station via an access link, the second activation indication activating the second subset of the frequency resources of the second resource pool, wherein the first sidelink device transmits the activation indication to the second sidelink device after receiving the second activation indication from the base station.

7. The method of claim 1, further comprising:
transmitting a deactivation indication to the second sidelink device based on an expiration of the timer, the deactivation indication deactivating the second subset of the frequency resources of the second resource pool.

8. The method of claim 7, further comprising:
receiving a feedback message from the second sidelink device acknowledging receipt of the deactivation indication,
wherein the first sidelink device receives the feedback message in the first subset of the frequency resources of the first resource pool or the second subset of the frequency resources of the second resource pool.

9. The method of claim 7, further comprising:
receiving a second deactivation indication from a base station for deactivating a current resource pool, the method further comprising:
transmitting a third deactivation indication to the second sidelink device in response to receiving the second deactivation indication from the base station.

10. The method of claim 1, further comprising:
receiving a second activation indication from the second sidelink device, the second activation indication activating a third resource pool of the BWP, the third resource pool comprising a third subset of the frequency resources configured to be activated and deactivated; and
receiving a second sidelink transmission from the second sidelink device using the third subset of the frequency resources of the third resource pool.

11. The method of claim 5, further comprising:
waiting to transmit the sidelink transmission to the second sidelink device in the second subset of the frequency resources until the feedback message is received from the second sidelink device after transmitting the activation indication.

12. The method of claim 8, wherein the feedback message is comprised in the first subset of the frequency resources of the first resource pool.

13. The method of claim 8, wherein the feedback message is comprised in the second subset of the frequency resources of the second resource pool.

14. The method of claim 7, wherein the activation indication comprises a sidelink wake-up signal.

15. The method of claim 7, wherein the activation indication is comprised in sidelink control information (SCI) that also schedules a sidelink data transmission.

16. An apparatus for wireless communication at a first sidelink device, comprising:
at least one memory; and
at least one processor coupled to the at least one memory and individually or collectively configured to:
identify a configuration of a bandwidth part (BWP) for sidelink communication, the BWP comprising at least a first resource pool including a first subset of frequency resources and a second resource pool including a second subset of the frequency resources;
transmit an activation indication to a second sidelink device, the activation indication activating the second subset of the frequency resources of the second resource pool;
transmit a sidelink transmission to the second sidelink device in the second subset of the frequency resources of the second resource pool;
initiate a timer after transmitting the sidelink transmission in the second subset of the frequency resources of the second resource pool; and
deactivate the second subset of the frequency resources of the second resource pool based on an expiration of the timer without sidelink traffic in the second resource pool.

17. The apparatus of claim 16, wherein
the first resource pool comprises a primary resource pool including the first subset of the frequency resources that are activated, and
the second resource pool comprises a secondary resource pool including the second subset of the frequency resources that are configured to be activated and deactivated.

18. The apparatus of claim 16, wherein the at least one processor is individually or collectively configured to transmit the activation indication in the first subset of the frequency resources of the first resource pool.

19. The apparatus of claim 16, wherein the activation indication comprises at least one of sidelink control information, a sidelink wake-up signal, a sidelink medium access control (MAC) control element (MAC-CE), or sidelink radio resource control signaling.

20. The apparatus of claim 16, wherein the at least one processor is further individually or collectively configured to:
receive a feedback message from the second sidelink device after a transmission of the activation indication, wherein the sidelink transmission is in the second subset of the frequency resources of the second resource pool after receiving the feedback message.

21. The apparatus of claim 20, wherein the at least one processor is further individually or collectively configured to:
wait to transmit the sidelink transmission to the second sidelink device in the second subset of the frequency resources until the feedback message is received from the second sidelink device after transmitting the activation indication.

22. The apparatus of claim 16, wherein the at least one processor is further individually or collectively configured to:
receive a second activation indication from a base station via an access link, the second activation indication activating the second subset of the frequency resources of the second resource pool, wherein the at least one processor is individually or collectively configured to transmit the activation indication to the second sidelink device after receiving the second activation indication from the base station.

23. The apparatus of claim 16, wherein the at least one processor is further individually or collectively configured to:
transmit a deactivation indication to the second sidelink device based on the expiration of the timer, the deactivation indication deactivating the second subset of the frequency resources of the second resource pool.

24. The apparatus of claim 23, wherein the activation indication comprises a sidelink wake-up signal.

25. The apparatus of claim 23, wherein the activation indication is comprised in sidelink control information (SCI) that also schedules a sidelink data transmission.

26. The apparatus of claim 23, wherein the at least one processor is further individually or collectively configured to:
receive a feedback message from the second sidelink device acknowledging receipt of the deactivation indication, the feedback message being in the first subset of the frequency resources of the first resource pool or the second subset of the frequency resources of the second resource pool.

27. The apparatus of claim 26, wherein the feedback message is comprised in the first subset of the frequency resources of the first resource pool.

28. The apparatus of claim 26, wherein the feedback message is comprised in the second subset of the frequency resources of the second resource pool.

29. The apparatus of claim 26, wherein the at least one processor is further individually or collectively configured to:
receive a second deactivation indication from a base station for deactivating a current resource pool; and
transmit a third deactivation indication to the second sidelink device in response to receiving the second deactivation indication from the base station.

30. The apparatus of claim 16, wherein the at least one processor is further individually or collectively configured to:
receive a second activation indication from the second sidelink device, the second activation indication activating a third resource pool of the BWP, the third resource pool comprising a third subset of the frequency resources configured to be activated and deactivated; and
receive a second sidelink transmission from the second sidelink device using the third subset of the frequency resources of the third resource pool.

* * * * *